(12) United States Patent
Seok

(10) Patent No.: US 10,516,519 B2
(45) Date of Patent: Dec. 24, 2019

(54) METHOD AND APPARATUS FOR TRANSMITTING RESPONSE FRAME BASED ON TYPE IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 12 days.

(21) Appl. No.: 15/884,137

(22) Filed: Jan. 30, 2018

(65) Prior Publication Data

US 2018/0175990 A1 Jun. 21, 2018

Related U.S. Application Data

(63) Continuation of application No. 14/931,753, filed on Nov. 3, 2015, now Pat. No. 9,917,679.

(60) Provisional application No. 62/080,026, filed on Nov. 14, 2014, provisional application No. 62/074,514, filed on Nov. 3, 2014.

(51) Int. Cl.
*H04L 5/00* (2006.01)
*H04L 1/00* (2006.01)
(Continued)

(52) U.S. Cl.
CPC .............. *H04L 5/0055* (2013.01); *H04L 1/00* (2013.01); *H04L 1/0041* (2013.01);
(Continued)

(58) Field of Classification Search
CPC ... H04L 5/0055; H04L 5/0053; H04L 5/0028; H04L 5/0037; H04L 5/0091; H04L 1/00
See application file for complete search history.

(56) References Cited

U.S. PATENT DOCUMENTS

2011/0103280 A1 5/2011 Liu et al.
2012/0106531 A1 5/2012 Seok et al.
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Jamal Javaid
(74) *Attorney, Agent, or Firm* — Morgan, Lewis & Bockius LLP

(57) ABSTRACT

The present disclosure relates to a method and apparatus for transmitting a response frame based on a type in a High Efficiency Wireless Local Area Network (WLAN) (HEW). According to an aspect, a method for transmitting an uplink frame by a station (STA) to an access point (AP) in a WLAN may be provided. The method may include receiving, from the AP, a downlink frame including information related to a type of the uplink frame, the type of the uplink frame including a single-user (SU) type and a multiple-user (MU) type; and transmitting, to the AP, the uplink frame having a type determined based on the information related to the type of the uplink frame, wherein, when the type of the uplink frame corresponds to the MU type, the uplink frame is simultaneously transmitted by a plurality of STAs including the STA and at least one other STA.

20 Claims, 23 Drawing Sheets

(51) Int. Cl.
  *H04L 1/16* (2006.01)
  *H04L 1/06* (2006.01)
  *H04W 84/12* (2009.01)
  *H04W 72/04* (2009.01)

(52) U.S. Cl.
  CPC .......... *H04L 1/0045* (2013.01); *H04L 1/0075* (2013.01); *H04L 1/0079* (2013.01); *H04L 1/0618* (2013.01); *H04L 1/1671* (2013.01); *H04L 5/0028* (2013.01); *H04L 5/0037* (2013.01); *H04L 5/0053* (2013.01); *H04L 5/0091* (2013.01); *H04L 1/1685* (2013.01); *H04L 5/008* (2013.01); *H04L 5/0023* (2013.01); *H04L 5/0048* (2013.01); *H04L 2001/0093* (2013.01); *H04W 72/042* (2013.01); *H04W 84/12* (2013.01)

(56) References Cited

U.S. PATENT DOCUMENTS

| | | |
|---|---|---|
| 2013/0188627 A1 | 7/2013 | Cheong et al. |
| 2014/0126509 A1 | 5/2014 | You |
| 2015/0085836 A1 | 3/2015 | Kang et al. |
| 2015/0124689 A1* | 5/2015 | Merlin .................. H04L 5/0055 370/312 |
| 2015/0181589 A1* | 6/2015 | Luo ...................... H04B 7/0452 370/329 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

HE PPDU Format

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-SIG-C | PSDU(AP to STA1, STA2) |

FIG. 13

METHOD AND APPARATUS FOR TRANSMITTING RESPONSE FRAME BASED ON TYPE IN A HIGH EFFICIENCY WIRELESS LAN

CROSS-REFERENCE TO RELATED APPLICATIONS

This application is a continuation application of U.S. application Ser. No. 14/931,753, entitled "METHOD AND APPARATUS FOR TRANSMITTING RESPONSE FRAME BASED ON TYPE IN A HIGH EFFICIENCY WIRELESS LAN," filed on Nov. 3, 2015, now U.S. Pat. No. 9,917,679, which claims the benefit of U.S. Provisional Application No. 62/074,514, entitled "HEW PPDU PROTECTION MECHANISM," filed on Nov. 3, 2014, and U.S. Provisional Application No. 62/080,026, entitled "ENHANCED DOWNLINK MU-MIMO PROCEDURE," filed on Nov. 14, 2014, the entirety of each of which is incorporated herein by reference.

BACKGROUND

The present disclosure relates to a Wireless Local Area Network (WLAN), and more particularly, to a method, apparatus, and software for transmitting a response frame according to a type in a High Efficiency WLAN (HEW), and a recording medium that stores the software.

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as an ultra-high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for protecting a transmitted frame and no specified method for determining the type of a response frame in a HEW.

SUMMARY OF THE DISCLOSURE

Objects of the present disclosure is to provide a method for protecting a transmitted frame and a method for determining the type of a response frame in a High Efficiency WLAN (HEW).

The objects of the present disclosure are not limited to the foregoing descriptions, and additional objects will become apparent to those having ordinary skill in the pertinent art to the present disclosure based upon the following descriptions.

In an aspect of the present disclosure, a method for transmitting an uplink frame by a station (STA) to an access point (AP) in a WLAN may be provided. The method may include receiving, from the AP, a downlink frame including information related to a type of the uplink frame, the type of the uplink frame including a single-user (SU) type and a multiple-user (MU) type; and transmitting, to the AP, the uplink frame having a type determined based on the information related to the type of the uplink frame, wherein, when the type of the uplink frame corresponds to the MU type, the uplink frame is simultaneously transmitted by a plurality of STAs including the STA and at least one other STA.

In another aspect of the present disclosure, a method for receiving an uplink frame by an AP from at least one STA in a WLAN may be provided. The method may include transmitting, to the at least one STA, a downlink frame including information related to a type of the uplink frame, the type of the uplink frame including a single-user (SU) type and a multiple-user (MU) type; and receiving, from the at least one STA, the uplink frame having a type determined based on the information related to the type of the uplink frame, wherein, when the type of the uplink frame corresponds to the MU type, the uplink frame is simultaneously transmitted by a plurality of STAs including the at least one STA.

In another aspect of the present disclosure, a STA apparatus for transmitting an uplink frame to an AP in a WLAN may be provided. The STA apparatus may include a baseband processor, a Radio Frequency (RF) transceiver, a memory, etc. The baseband processor may be configured to receive, from the AP, a downlink frame including information related to a type of the uplink frame, the type of the uplink frame including a single-user (SU) type and a multiple-user (MU) type; and transmit, to the AP, the uplink frame having a type determined based on the information related to the type of the uplink frame, wherein, when the type of the uplink frame corresponds to the MU type, the uplink frame is simultaneously transmitted by a plurality of STAs including the STA and at least one other STA.

In another aspect of the present disclosure, an AP apparatus for receiving an uplink frame from at least one STA in a WLAN may be provided. The AP apparatus may include a baseband processor, an RF transceiver, a memory, etc. The baseband processor may be configured to transmit, to the at least one STA, a downlink frame including information related to a type of the uplink frame, the type of the uplink frame including a single-user (SU) type and a multiple-user (MU) type; and receive, from the at least one STA, the uplink frame having a type determined based on the information related to the type of the uplink frame, wherein, when the type of the uplink frame corresponds to the MU type, the uplink frame is simultaneously transmitted by a plurality of STAs including the at least one STA.

In another aspect of the present disclosure, a software or computer-readable medium having instructions executable for an STA to transmit an uplink frame to an AP in a WLAN may be provided. The executable instructions may cause the STA to receive, from the AP, a downlink frame including information related to a type of the uplink frame, the type of the uplink frame including a single-user (SU) type and a multiple-user (MU) type; and transmit, to the AP, the uplink frame having a type determined based on the information related to the type of the uplink frame, wherein, when the type of the uplink frame corresponds to the MU type, the uplink frame is simultaneously transmitted by a plurality of STAs including the STA and at least one other STA.

In another aspect of the present disclosure, a software or computer-readable medium having instructions executable for an AP to receive an uplink frame from at least one STA in a WLAN may be provided. The executable instructions may cause the AP to transmit, to the at least one STA, a downlink frame including information related to a type of the uplink frame, the type of the uplink frame including a single-user (SU) type and a multiple-user (MU) type; and receive, from the at least one STA, the uplink frame having a type determined based on the information related to the type of the uplink frame, wherein, when the type of the uplink frame corresponds to the MU type, the uplink frame is simultaneously transmitted by a plurality of STAs including the at least one STA.

It is to be understood that both the foregoing summarized features are exemplary aspects of the following detailed description of the present disclosure without limiting the scope of the present disclosure.

According to the present disclosure, a method for protecting a transmitted frame and a method for determining the type of a response frame in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of an High Efficiency Long Training Field (HE-LTF) field in a HE PPDU frame format according to the present disclosure;

FIG. 12 depicts a High Efficiency Signal B (HE-SIG-B) field and a High Efficiency Signal C (HE-SIG-C) field in the HE PPDU frame format according to the present disclosure;

FIG. 13 depicts another example of a HE PPDU frame format according to the present disclosure;

DETAILED DESCRIPTION

Figure 1:
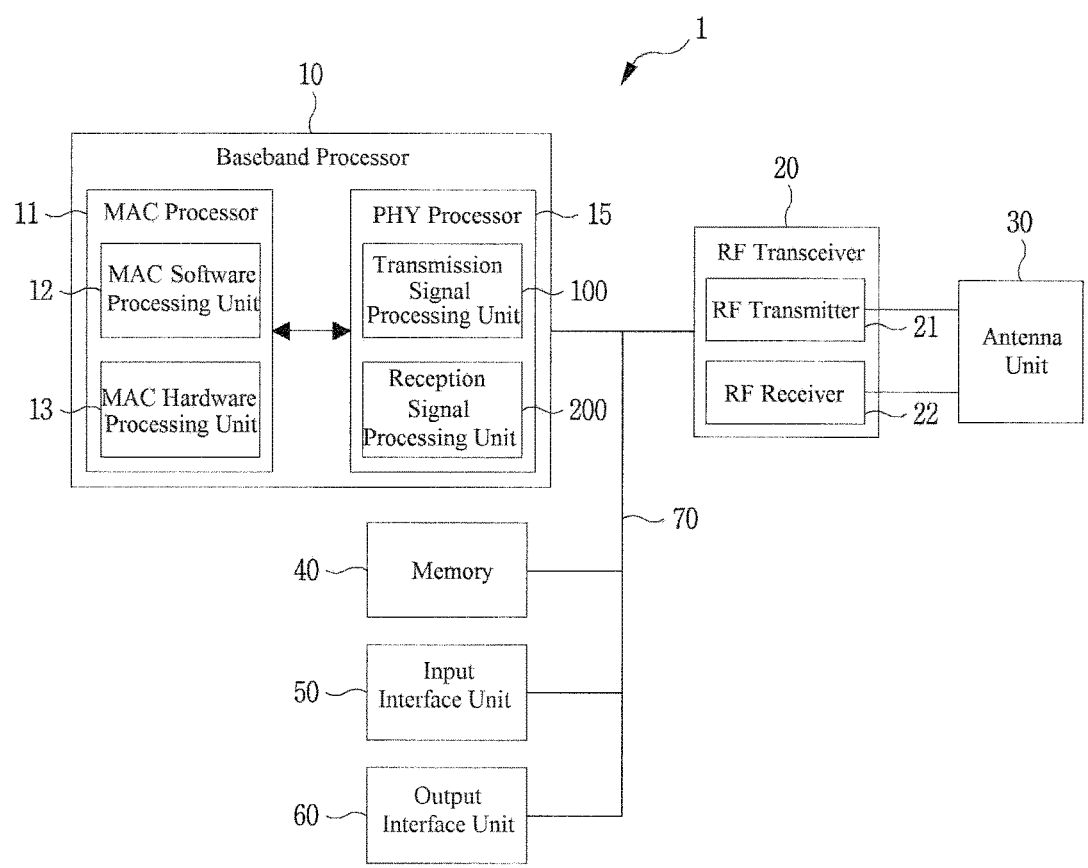
FIG. 1 is a block diagram of a Wireless Local Area Network (WLAN) device.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a Physical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
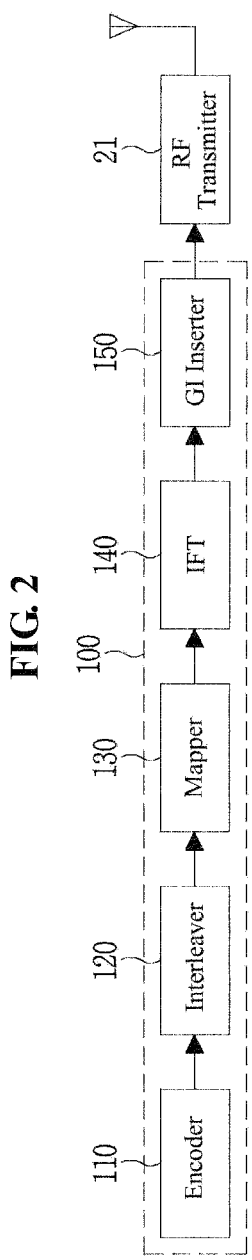
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of Os or is. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
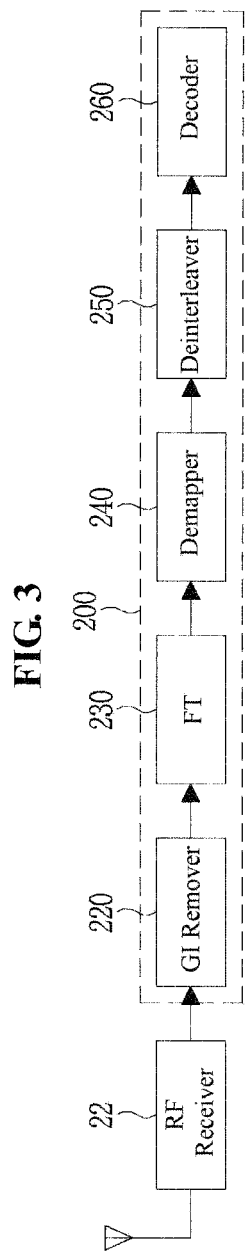
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
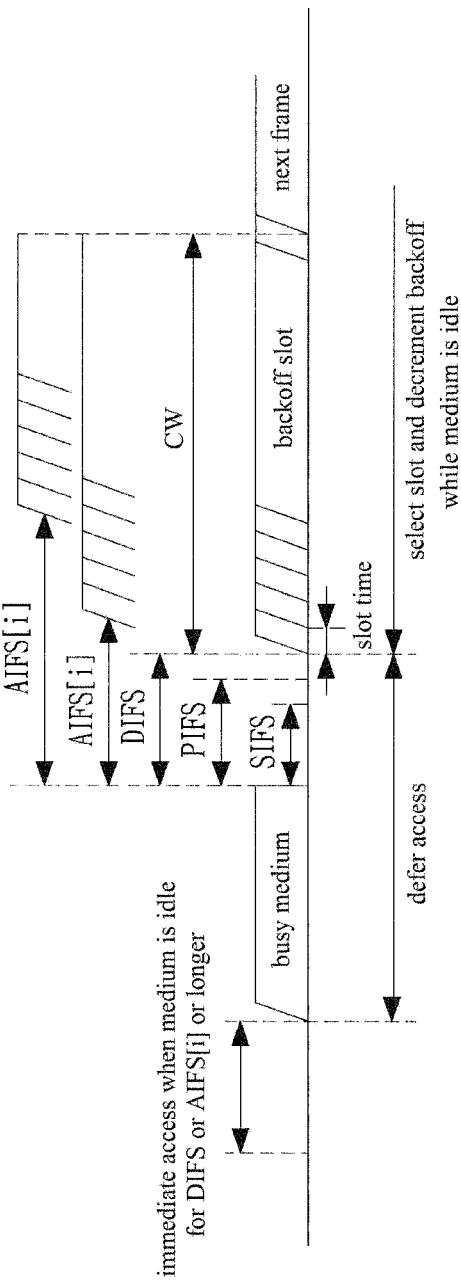
FIG. 4 depicts a relationship between Inter Frame Spaces (IFSs)

FIG. 4 depicts a relationship between Inter Frame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an Acknowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
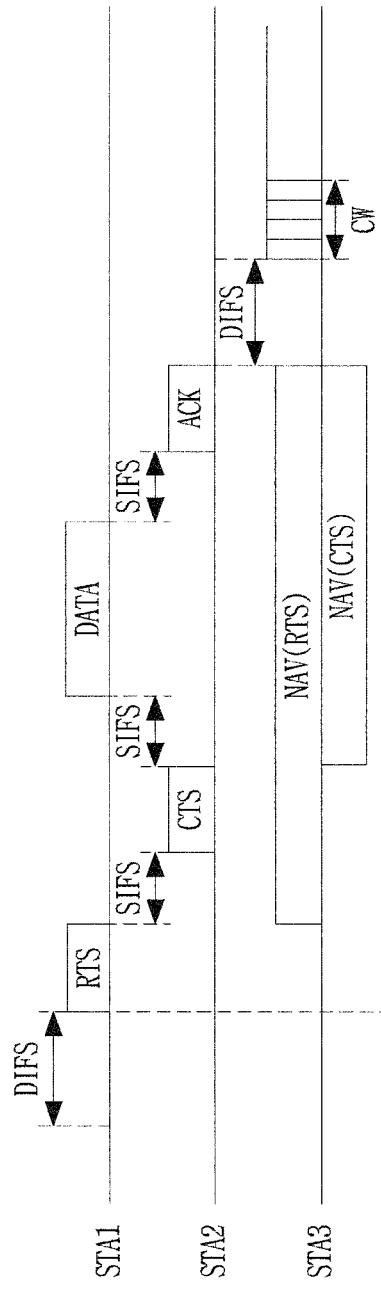
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
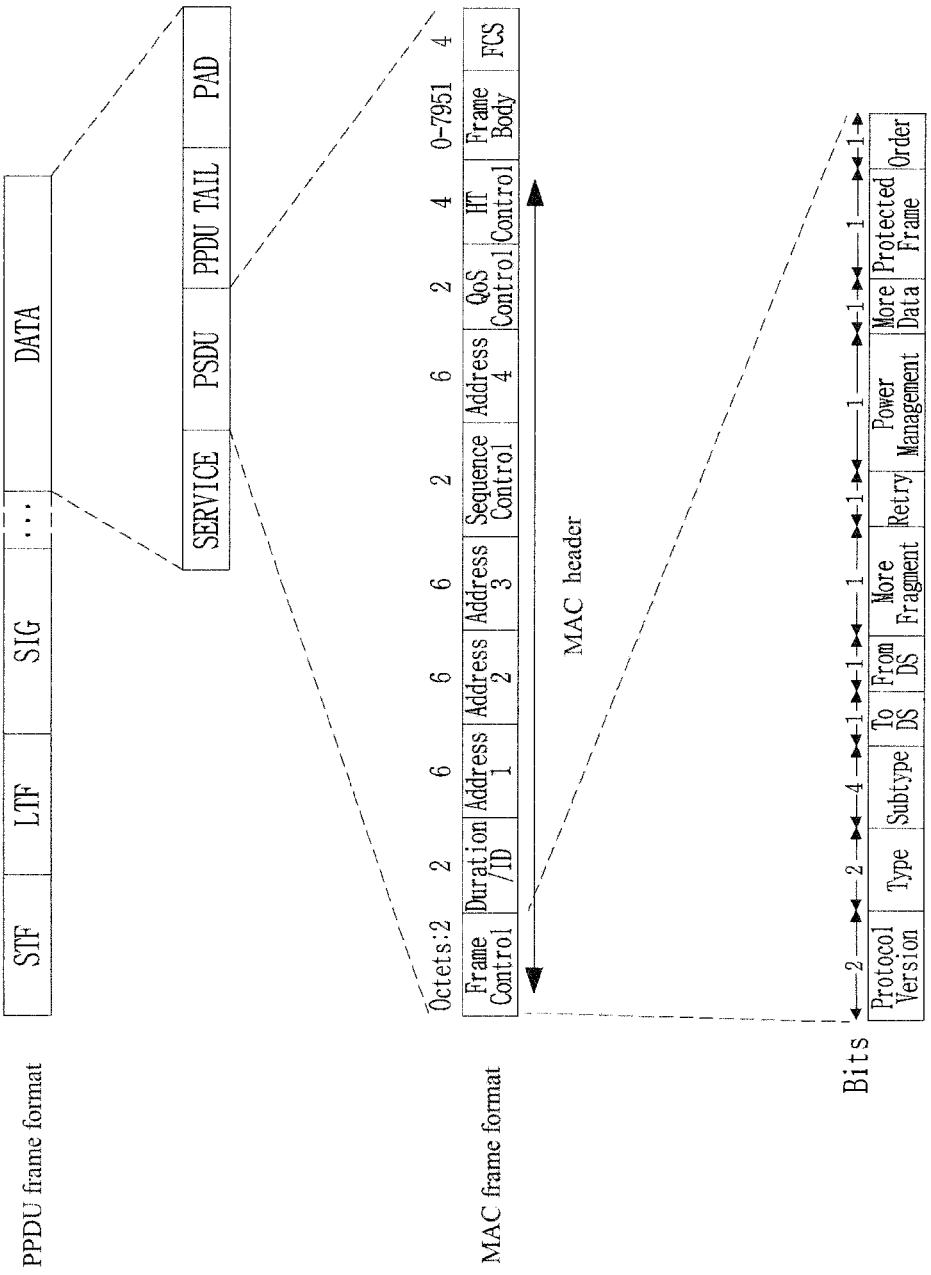
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
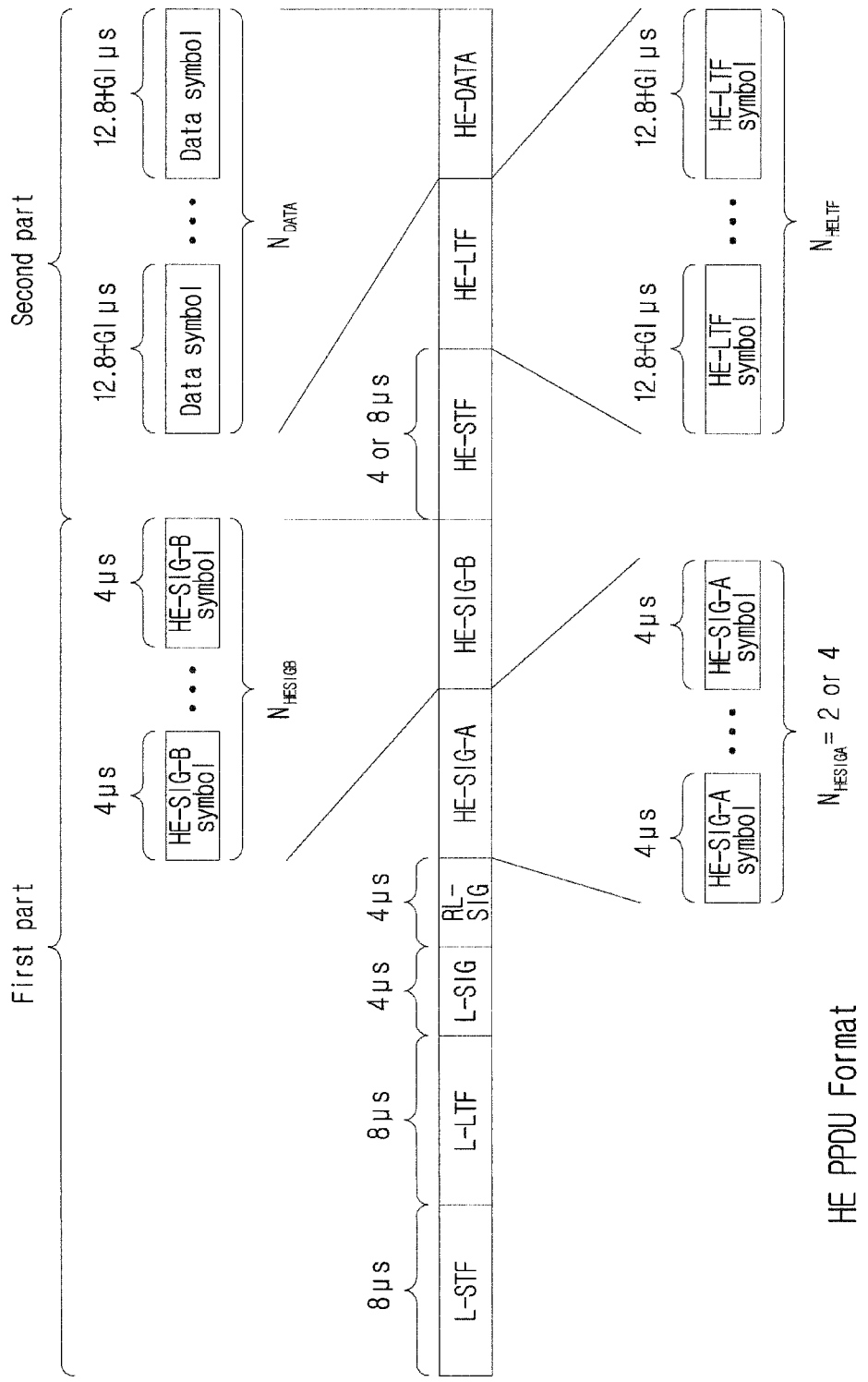
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may detect a PPDU and then process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table 1.

TABLE 1

| Element | definition | duration | DFT period | GI | Subcarrier spacing | Description |
|---|---|---|---|---|---|---|
| Legacy(L)-STF | Non-high throughput (HT) Short Training field | 8 μs | — | — | equivalent to 1,250 kHz | L-STF of a non-triggered-based PPDU has a periodicity of 0.8 μs with 10 periods. |
| L-LTF | Non-HT Long Training Field | 8 μs | 3.2 μs | 1.6 μs | 312.5 kHz | |

TABLE 1-continued

| Element | definition | duration | DFT period | GI | Subcarrier spacing | Description |
|---|---|---|---|---|---|---|
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz: trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE long Training field | $NH_{HELTF}$ * (DTF period * GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $NH_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}$*(DFT period+GI)μs. $N_{HELTF}$ represents the number of HE-LTF symbols and may have a value of 1, 2, 4, 6, or 8. A HE PPDU may support a 2×LTF mode and a 4×LTF mode. In the 2×LTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4×LTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2×LTF may have a DFT period of 6.4 μs and 4×LTF may have a DFT period of 12.8 μs. A GI of HE-LTF may support 0.8 μs, 1.6 μs, and 3.2 μs. 2×LTF may have a subcarrier spacing equivalent to 156.25 kHz and 4×LTF may have a subcarrier spacing of 78.125 kHz.

HE-DATA is a HE DATA field and may have a duration of, $N_{DATA}*(DFT\ period+GI)$μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
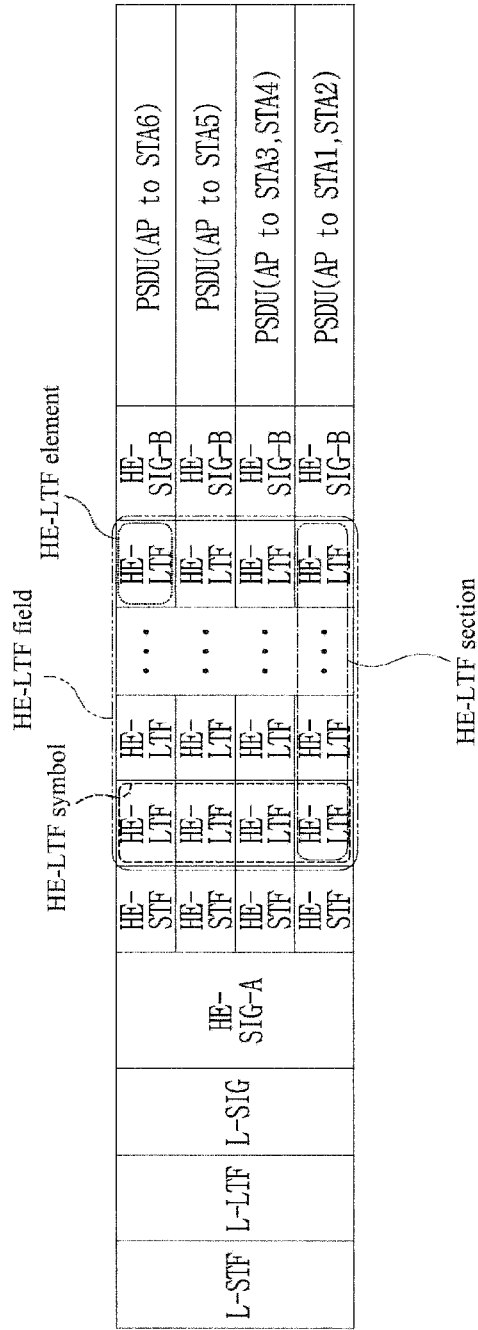
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |

TABLE 2-continued

| Two parts of VHT-SIG-A | Bit | Field | Number of bits | Description |
|---|---|---|---|---|
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1.<br>B7 is reserved and set to 1 |

TABLE 2-continued

| Two parts of VHT-SIG-A | Bit | Field | Number of bits | Description |
|---|---|---|---|---|
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present disclosure, the HE-SIG-A field may include one or more of the fields included in the VHT-SIG-A field, and it may provide backward compatibility with IEEE 802.11ac stations.

Figure 9:
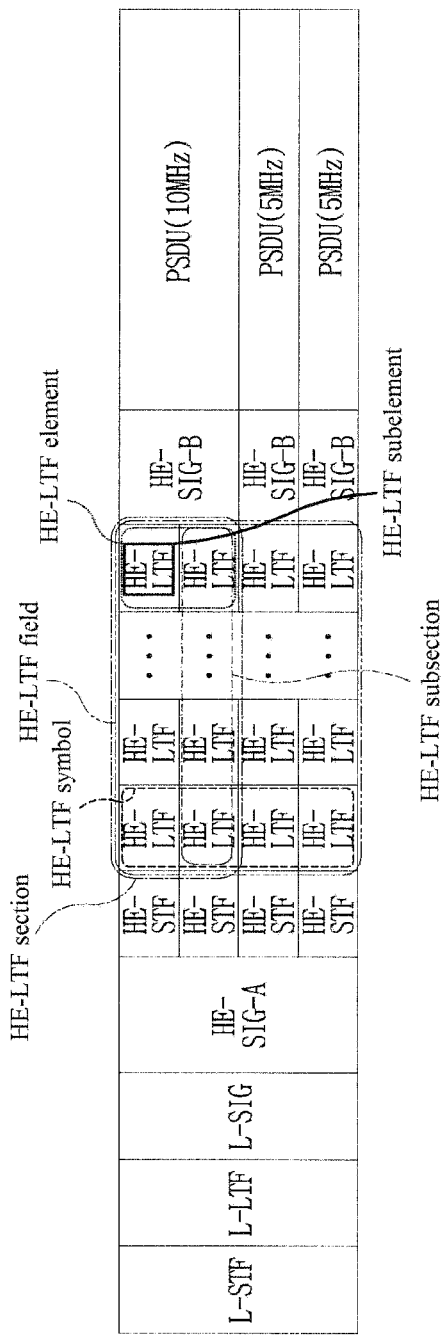
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
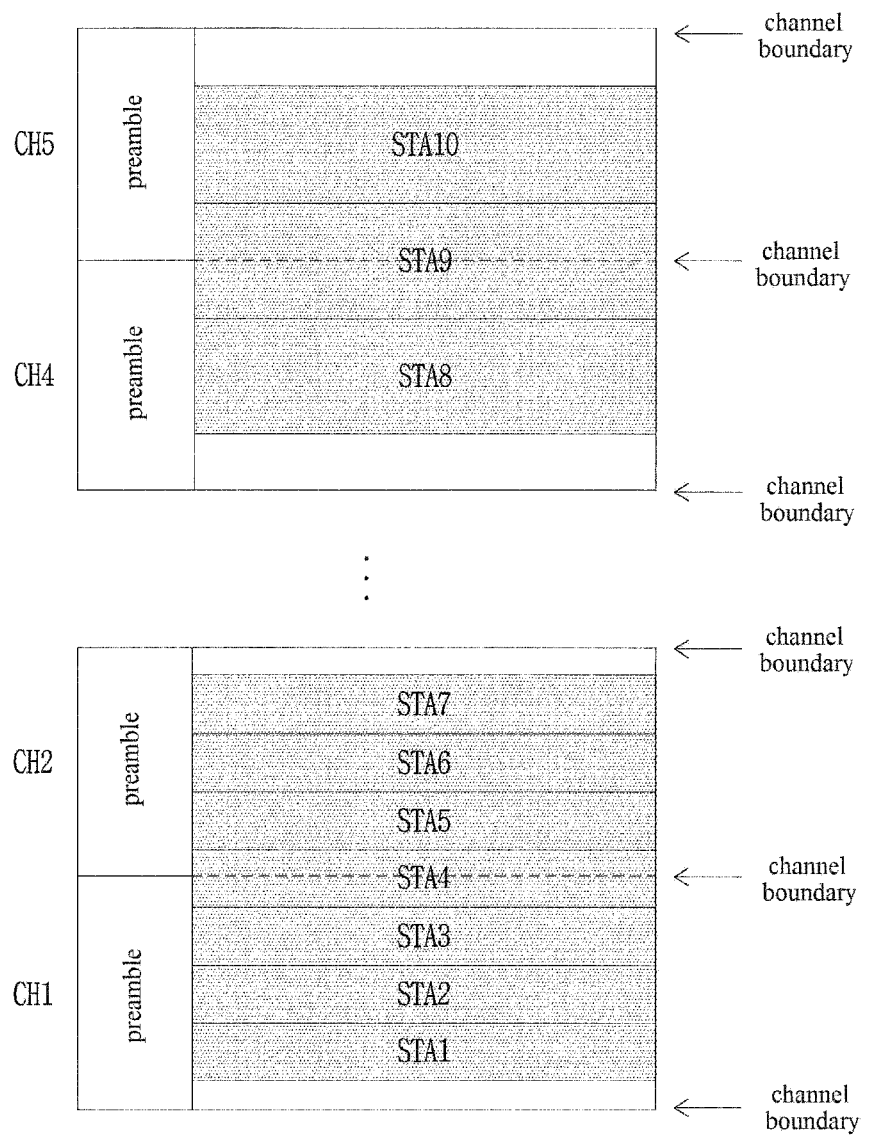
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present disclosure, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present disclosure, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present disclosure, relationship between a total number of spatial streams transmitted on one subchannel and a number of HE-LTFs is listed in [Table 3].

TABLE 3

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

With reference to the foregoing examples of the present disclosure, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 13 may be used for a UL HE PPDU transmission.

Figure 13:
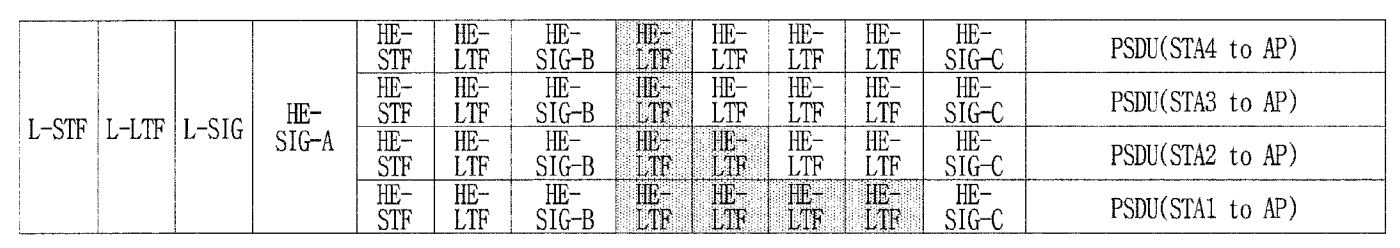

FIG. 13 depicts another exemplary HE PPDU frame format according to the present disclosure. The HE PPDU frame format illustrated in FIG. 13 is characterized in that a structure of HE-SIG-A, HE-SIG-B, and HE-SIG-C fields similar to in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 13 may not exist. In this case, a description of each field given below may be applied only in the presence of the field.

In the example of FIG. 13, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 14:
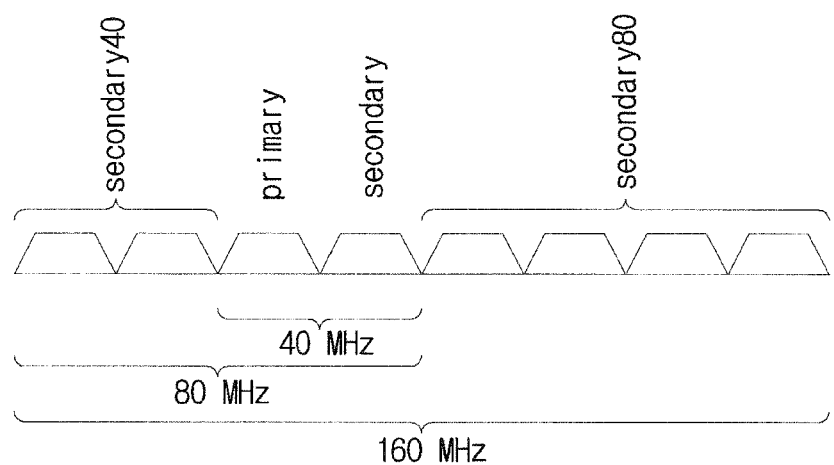
FIGS. 14 and 15 depict operating channels in a WLAN system.
Figure 15:
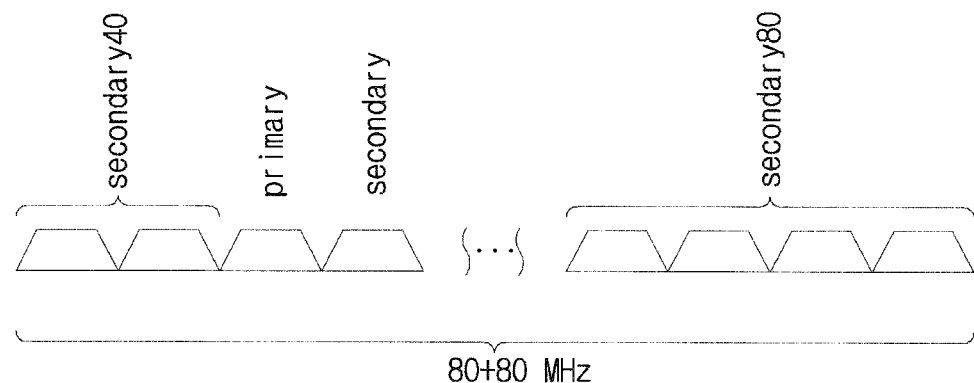

FIGS. 14 and 15 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 14). Further, the WLAN system may support a BSS operating channel having a bandwidth of 160 MHz including non-contiguous 80-MHz channels (called a bandwidth of 80+80 MHz) (refer to FIG. 15).

As illustrated in FIG. 14, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 15, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If an STA uses a channel width larger than the channel width of the primary channel, for data transmission, the STA may use another channel within a corresponding channel, in addition to the primary channel. This additional channel is referred to as a secondary channel.

A STA according to an Enhanced Distributed Channel Access (EDCA) scheme may determine a transmission bandwidth (or a transmission channel width) as follows.

Upon generation of a transmission frame, an STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if a STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 14 and 15 may be referred to for a primary channel (i.e., a primary 20-MHz channel) a secondary channel (i.e., a secondary 20-MHz channel), a secondary 40-MHz channel, and a secondary 80-MHz channel).

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Now, a description will be given of a method for performing UL SU PPDU transmission or UL MU PPDU transmission according to the type of a response to DL MU transmission and a method for protecting a DL/UL HE PPDU in a WLAN system supporting DL/UL MU transmission.

The method for protecting a DL/UL HE PPDU will first be described below.

Transmission of a HE PPDU may be protected by preventing another STA (e.g., a third-party STA) from accessing a wireless channel during transmission of the HE PPDU. For this purpose, a specific field included in the HE PPDU may be used.

That is, the third-party STA may regard the channel as busy during a corresponding time period based on duration information included in a PHY header (e.g., an L-SIG, a HE-SIG-A, a HE-SIG-B, etc.) of the HE PPDU.

For example, the third-party STA (e.g., including a legacy STA that is not capable of decoding a HE preamble and a data part of the HE PPDU and a HE STA capable of decoding the HE PPDU) may not perform transmission during the corresponding time period based on a duration (i.e., an L-SIG duration) determined according to a parameter (e.g., a L_LENGTH subfield or an L_DATARATE subfield) included in the L-SIG field of the HE PPDU. As a consequence, since the third-party STA does not attempt to access the channel during the time period determined based on the L-SIG duration even though the channel is physically idle, the HE PPDU transmission may be protected.

For example, the parameter, L_LENGTH or L_DATARATE included in the L-SIG field may be set as follows by [Equation 1].

$$\text{L\_LENGTH} = \left\lceil \frac{((TXTIME - \text{Signal Extension}) - (aPreambleLength + aPHYHeaderLength))}{aSymbolLength} \right\rceil \times N_{OPS} - \left\lceil \frac{aPHYServiceLength + aPHYConvolutionalTailLength}{8} \right\rceil \quad \text{[Equation 1]}$$

In [Equation 1], ⌈ ⌉ represents a ceiling operation and ⌈x⌉ represents the least integer equal to or larger than x.

If a TXVECTOR parameter, NO_SIG_EXTN is set to True, SignalExtension may have a value of 0 μs. On the other hand, if the TXVECTOR parameter, NO_SIG_EXTN is set to False, SignalExtension may have a value corresponding to a duration defined by an aSignalExtension parameter (6 μs in 2.4 GHz and 0 μs in 5 GHZ).

aSymbolLength may have a value corresponding to a symbol duration (in μs). In general, aSymbolLength may have a fixed value of 4.

(aPreambleLength+aPHYHeaderLength) may have a value corresponding to the durations of a non-HT PHY preamble and an L-SIG (in μs), and may follow what is defined in a PLME-CHARACTERISTICS.confirm primitive.

If a rate specified by L_DATARATE is used, $N_{OPS}$ may have a value corresponding to the number of octets transmitted during a time period indicated by aSymbolLength. In general, L_DATARATE may have a fixed value of 6 Mbps. In this case, $N_{OPS}$ may have a fixed value of 4.

aPHYServiceLength may have a value corresponding to the number of bits of a PHY SERVICE field.

aPHYConvolutionalTailLength may have a value corresponding to the number of bits of a convolutional code tail bit sequence.

In the case of a HE PPDU, if (aPreambleLength+aPHYHeaderLength)=20, aSymbolLength=4, $N_{OPS}$=3, and 24≤(aPHYServiceLength+aPHYConvolutionalTailLength)<32 in the above [Equation 1], the value of the L_LENGTH subfield may be expressed as [Equation 2].

$$\text{L\_LENGTH} = \left\lceil \frac{((TXTIME - \text{Signal Extension}) - 20)}{4} \right\rceil \times 3 - 3 \quad \text{[Equation 2]}$$

In [Equation 2], TXTIME represents the duration of the HE PPDU, defined by [Equation 3].

$$TXTIME = T_{L-STF} + T_{L-LTF} + T_{L-SIG} + T_{HE-SIG-A} + \left\lceil \frac{T_{HE-STF} + N_{HELTF} \times T_{HE-LTF} + T_{HE-SIG-B} + N_{SYM} \times T_{SYMD}}{T_{SYML}} \right\rceil \times T_{SYML} \quad \text{[Equation 3]}$$

In [Equation 3], $T_{L-STF}$ may have a value corresponding to the duration of a Non-HT STF field (e.g., 8 μs).

$T_{L-LTF}$ may have a value corresponding to the duration of a Non-HT LTF field (e.g., 8 µs).

$T_{L-SIG}$ may have a value corresponding to the duration of a Non-HT SIGNAL field (e.g., 4 µs).

$T_{HE-SIG-A}$ may have a value corresponding to the duration of a HE-SIG-A field (e.g., 8 µs or 12 µs). Or $T_{HE-SIG-A}$ may have a value based on a duration of $N_{HESIGA}*4$ µs and a GI of 0.8 µs, as illustrated in [Table 1].

If a HE-SIG-B field is not included in the HE PPDU, $T_{HE-SIG-B}$ may have a value of 0, and if the HE-SIG-B field is included in the HE PPDU, $T_{HE-SIG-B}$ may have a value corresponding to the duration of the HE-SIG-B field (e.g., 16 µs or 15.6 µs). Or $T_{HE-SIG-B}$ may have a value based on a duration of $N_{HESIGB}*4$ µs and a GI of 0.8 µs, as illustrated in [Table 1].

$T_{HE-STF}$ may have a value corresponding to the duration of a HE-STF field (e.g., 16 µs or 15.6 µs). Or $T_{HE-STF}$ may have a value of 4 µs or 8 µs, as illustrated in [Table 1].

$T_{HEW-LTF}$ may have a value corresponding to the duration of a HE-LTF field (e.g., 16 µs or 15.6 µs). Or $T_{HEW-LTF}$ may have a value of $N_{HELTF}*(DFT\ interval+GI)\mu$, as illustrated in [Table 1].

$N_{HELTF}$ may have a value corresponding to the number of HE-LTF symbols.

$T_{SYMD}$ may have a value corresponding to a double GI symbol interval (e.g., 16 µs or 15.6 µs).

$T_{SYML}$ may have a value corresponding to a long GI symbol interval (e.g., 4 µs).

$N_{SYM}$ may have a value corresponding to the number of symbols of a DATA (or HE-DATA) field.

As illustrated in [Equation 3], since the HE-STF, HE-LTF, HE-SIG-B, and DATA (or HE-DATA) fields have variable durations (e.g. in view of an included variable GI) in the HE PPDU, a ceiling operation may be applied in consideration that division of the durations by the number of OFDM symbols results in a remainder.

Further, $T_{RL-SIG}$ having a value corresponding to the duration of an RL-SIG field of the HE PPDU may be added to TXTIME depicted in [Equation 3].

In another example of protecting transmission of a HE PPDU using a specific field included in the HE PPDU from a third-party STA, a Duration/ID field (or a Duration field) included in the MAC header of a data unit (e.g., a PSDU field, a DATA field, or a HE-DATA field) in the HE PPDU may be used. As a third-party STA (e.g., a HE STA capable of decoding the HE PPDU) sets a NAV, the Duration field of the MAC header may induce the third-party STA to regard a channel as busy for a corresponding time period. Therefore, even though the channel is physically idle during a time period to which the NAV is set, the third-party STA may not attempt to access the channel, thereby protecting the HE PPDU transmission.

Figure 16:
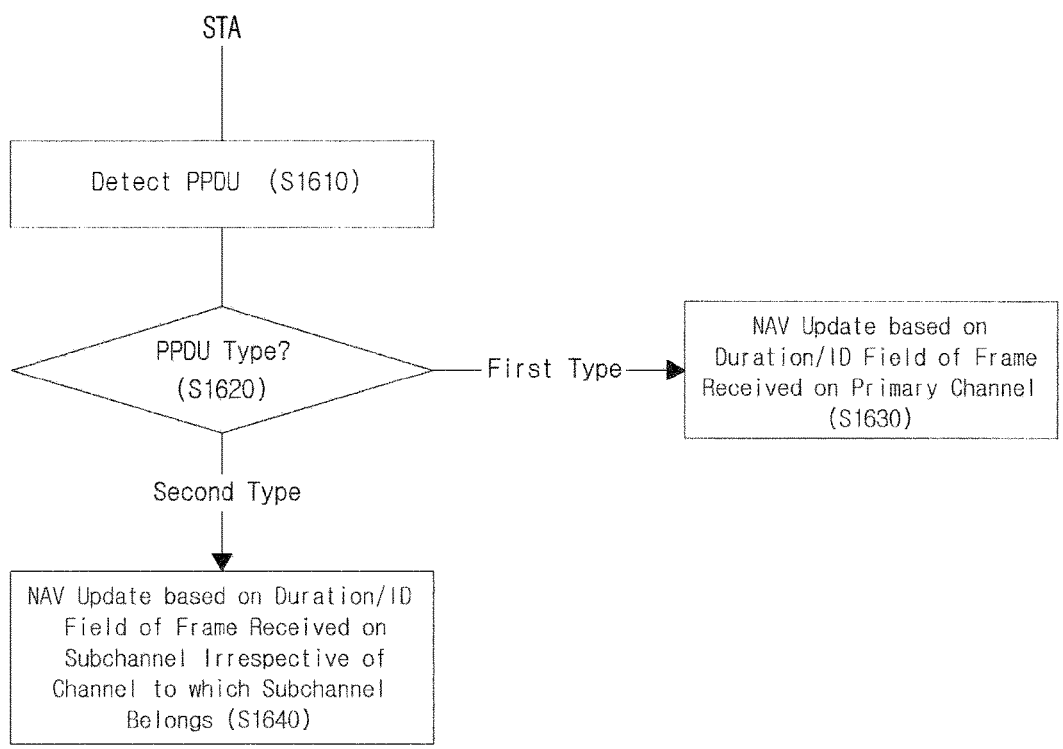
FIG. 16 depicts a Network Allocation Vector (NAV) update operation of an STA according to the present disclosure.

FIG. 16 depicts a NAV update operation of an STA according to the present disclosure.

Upon detection of a PPDU (S1610), the STA may determine the type of the PPDU (S1620). According to an embodiment, the PPDU may have a first type or a second type. Specifically, the first type may be a non-OFDMA PPDU type or an SU type, and the second type may be an OFDMA PPDU type or an MU type.

If the types allowed for a PPDU include the non-OFDMA PPDU type as the first type and the OFDMA PPDU type as the second type, the STA may perform NAV update depending on whether the received PPDU is an OFDMA PPDU. The STA may determine whether the received PPDU is an OFDMA PPDU by checking whether a transmission channel bandwidth of the (HE) PPDU is equal to a transmission channel bandwidth of a PSDU. A NAV may be updated in different manners in the cases of reception of an OFDMA PPDU and reception of a non-OFDMA PPDU.

If the PPDU is of the first type, particularly the non-OFDMA PPDU type, the STA performs a NAV update operation for a first-type PPDU (non-OFDMA PPDU) (S1630). When the PPDU is of the first type, the STA performs NAV update based on the Duration/ID field of a frame received on a primary channel. If the transmission channel bandwidth of a (HE) PPDU is equal to the transmission channel bandwidth of a PSDU, a (HE) STA receiving the (HE) PPDU may set a NAV as defined as follows: If a Receiver Address (RA) matching to the MAC address of the (HE) STA is not included in any frame received in a 20-MHz (HE) PPDU on a primary 20-MHz channel, in a 40-MHz (HE) PPDU on a primary 40-MHz channel, in a 80-MHz (HE) PPDU on a primary 80-MHz channel, or in a 160-MHz or 80+80-MHz (HE) PPDU, a NAV of the (HE) STA is updated using the Duration/ID field (or the Duration field) of the frame. Specifically, if the STA receives a frame that belongs to a secondary channel (a secondary 20-MHz channel, a secondary 40-MHz channel, or a secondary 80-MHz channel) but does not belong to a primary channel (a primary 20-MHz channel, a primary 40-MHz channel, or a primary 80-MHz channel), the STA does not perform the NAV update.

On the other hand, if the PPDU is of the second type, particularly the OFDMA PPDU type, the STA performs a NAV update operation for a second-type PPDU (OFDMA PPDU) (S1640). If the PPDU is of the second type, the STA may perform NAV update based on the Duration/ID field of a frame received on a subchannel, irrespective of a channel to which the received subchannel belongs (i.e., without considering whether the received subchannel carrying the PPDU belongs to a primary channel or a secondary channel). In the case of a HE PPDU supporting DL/UL OFDMA transmission, the channel bandwidth of a PSDU for a specific HE STA may be smaller than the channel bandwidth of the HE PPDU. In the example of FIG. 13, a HE PPDU has a transmission channel bandwidth of 20 MHz, and a PSDU for STA1 has a transmission channel bandwidth (i.e., a subchannel bandwidth) of 5 MHz. If a PSDU has a smaller transmission channel bandwidth than a HE PPDU as in the example, a HE STA receiving the HE PPDU may set a NAV as defined as follows. If an RA matching to the MAC address of the HE STA is not included in any frame received on any subchannel of a 20-MHz HE PPDU (or a 20-MHz OFDMA PPDU) on a primary 20-MHz channel, any subchannel of a 40-MHz HE PPDU (or a 40-MHz OFDMA PPDU) on a primary 40-MHz channel, any subchannel of a 80-MHz HE PPDU (or a 80-MHz OFDMA PPDU) on a primary 80-MHz channel, or any subchannel of a 160-MHz or 80+80-MHz HE PPDU (or a 160-MHz or 80+80-MHz OFDMA PPDU), the HE STA updates its NAV using the Duration/ID field (or the Duration field) of the frame.

Specifically, if a HE STA receives a frame including an RA that does not match to the MAC address of the HE STA on any subchannel, the HE STA updates its NAV using the Duration/ID field (or the Duration field) of the frame, irrespective of whether the subchannel belongs to the primary 20-MHz channel, the secondary 20-MHz channel, the secondary 40-MHz channel, or the secondary 80-MHz channel.

More specifically, if the RA matching to the MAC address of the HE STA is not included in any frame received on any subchannel of a 40-MHz HE PPDU (or a 40-MHz OFDMA PPDU) on the primary 40-MHz channel, the HE STA updates its NAV using the Duration/ID field (or the Duration field) of the frame, irrespective of whether the subchannel belongs to the primary 20-MHz channel or the secondary 20-MHz channel. If the RA matching to the MAC address of the HE STA is not included in any frame received on any subchannel of a 80-MHz HE PPDU (or a 80-MHz OFDMA PPDU) on the primary 80-MHz channel, the HE STA updates its NAV using the Duration/ID field (or the Duration field) of the frame, irrespective of whether the subchannel belongs to the primary 20-MHz channel, the secondary 20-MHz channel, or the secondary 40-MHz channel. If the RA matching to the MAC address of the HE STA is not included in any frame received on any subchannel of a 160-MHz HE PPDU (or a 160-MHz OFDMA PPDU) or a 80+80-MHz HE PPDU (or a 80+80-MHz OFDMA PPDU) on a 160-MHz or 80+80-MHz channel, the HE STA updates its NAV using the Duration/ID field (or the Duration field) of the frame, irrespective of whether the subchannel belongs to the primary 20-MHz channel, the secondary 20-MHz channel, the secondary 40-MHz channel, or the secondary 80-MHz channel.

The HE PPDU may also include a resource unit having a channel bandwidth equal to or smaller than the channel bandwidth of the HE PPDU. HE PPDU protection may be implemented in the case where a HE PPDU is received on a secondary channel as well as in the case where a HE PPDU is received on a primary channel. Accordingly, NAV setting of a HE STA receiving a HE PPDU may be defined as follows. If an RA matching to the MAC address of the HE STA is not included in any frame received in any 20-MHz or less resource unit of a 20-MHz HE PPDU (or 20-MHz OFDMA PPDU) on the primary or secondary 20-MHz channel, in any 40-MHz or less resource unit of a 40-MHz HE PPDU (or 40-MHz OFDMA PPDU) on the primary or secondary 40-MHz channel, in any 80-MHz or less resource unit of a 80-MHz HE PPDU (or 80-MHz OFDMA PPDU) on the primary or secondary 80-MHz channel, in any 160-MHz or less resource unit of a 160-MHz or 80+80-MHz HE PPDU (or 160-MHz or 80+80-MHz OFDMA PPDU), the NAV of the HE STA is updated using the Duration/ID field (or the Duration field) of the frame.

Figure 17:
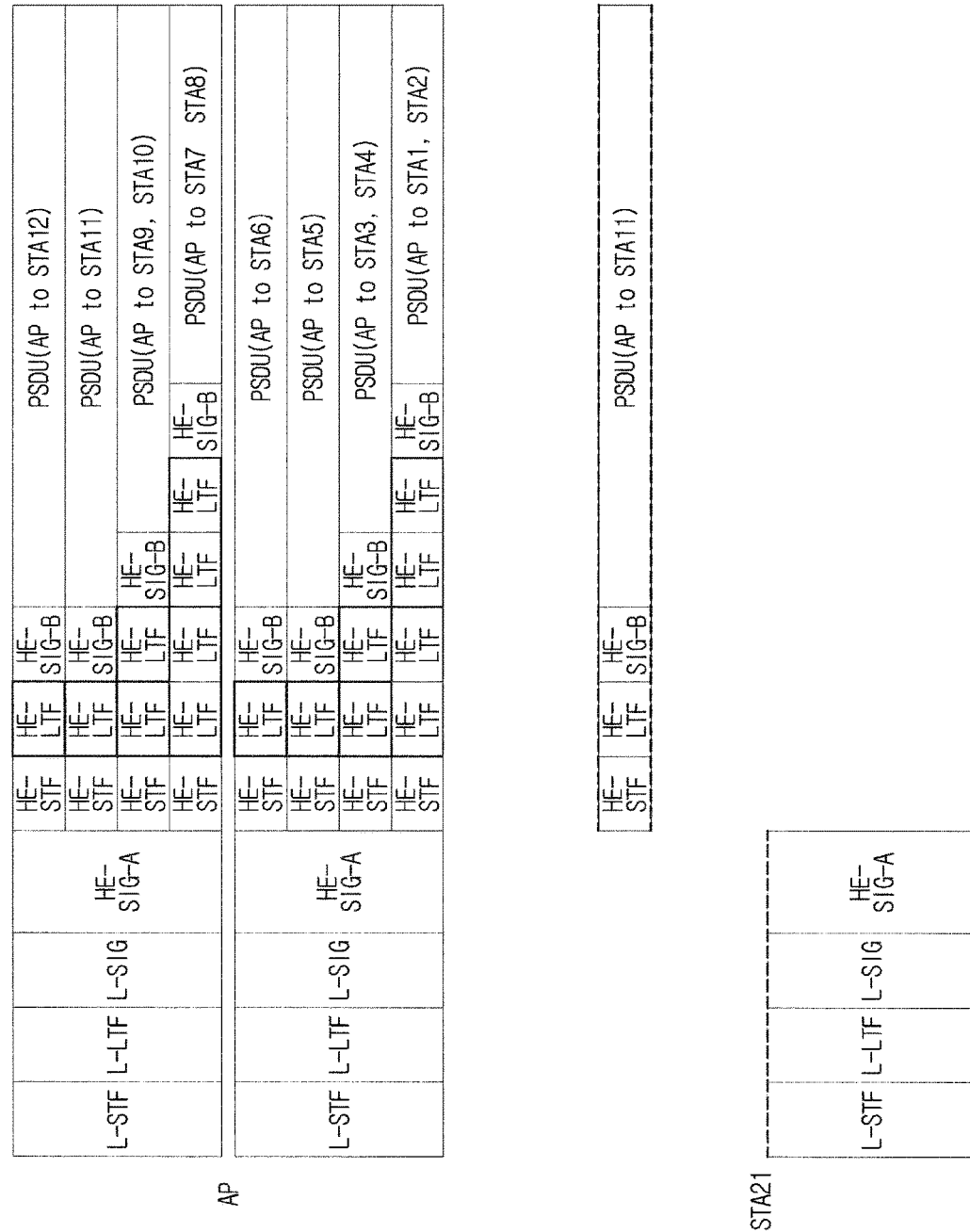
FIG. 17 depicts an operation of a third-party STA when a Downlink (DL) Orthogonal Frequency Division Multiple Access (OFDMA) PPDU is transmitted according to the present disclosure.

FIG. 17 depicts an operation of a third-party STA, when a DL OFDMA PPDU is transmitted according to the present disclosure.

While FIG. 17 illustrates an exemplary case where the transmission times of PSDUs are different on subchannels (i.e., the lengths of HE-LTF sections are different on the subchannels) in a DL HE PPDU format transmitted on each of a plurality of channels, a HE PPDU format in which the transmission times of PSDUs are identical on subchannels (i.e., the lengths of HE-LTF sections are equal on the subchannels) as illustrated in the examples of FIGS. 11, 12, and 13, and a UL HE PPDU format are also applicable.

FIG. 17 illustrates an operation of a third-party HE STA, STA21, when a DL OFDMA PPDU is transmitted to STA1, STA2, STA3, STA4, STA5, STA6, STA7, STA8, STA9, STA10, STA11, and STA12.

A HE preamble of the HE PPDU may include resource allocation information. For example, a plurality of destination STAs may acquire information about subchannels allocated to the STAs from the HE preamble (e.g., a HE-SIG (HE-SIG-A or HE-SIG-B) field) of the DL OFDMA PPDU. That is, the HE preamble of the HE PPDU may include STA identification information identifying an STA(s) allocated to a specific subchannel (or resource unit).

Because the size (e.g., the number of available bits) of information that can be included in the HE preamble is limited, STA identification information for a specific subchannel (or resource unit) may not specify only one STA. For example, the Association ID (AID) of an STA may be defined in 16 bits. If STA identification information identifying an STA allocated to a specific resource unit includes a partial AID (e.g., X (X<16) Least Significant Bits (LSBs) of an AID), one piece of STA identification information may identify a plurality of STAs. Or if an STA belonging to a BSS (OBSS) overlapping with a BSS of an AP receives a DL OFDMA PPDU, STAs of the different BSSs may correspond to one piece of STA identification information.

In this case, although an STA receiving the DL OFDMA PPDU may determine that it is a destination STA of the DL OFMDA PPDU based on the resource allocation information (e.g., STA identification information for a specific subchannel (or resource unit)) included in the HE preamble, the STA may not be an STA to which the AP has actually allocated resources. That is, although resources are not actually allocated to the STA, the STA may consider that resources are allocated to it based on the resource allocation information of the DL OFDMA PPDU.

The example of FIG. 17 illustrates a case in which subchannel allocation information is shared between STA11 and STA21. That is, although STA21 may consider that a subchannel is allocated to STA21 based on information of a HE preamble, STA11 and STA12 may not actually be serviced simultaneously in a DL OFDMA PPDU.

Specifically, although resources of a third 5-MHz subchannel of a second 20-MHz channel (an upper 20-MHz channel in FIG. 17) are actually allocated to STA11, STA21 may determine that the subchannel resources are allocated to STA21 from the HE preamble (e.g., HE-SIG-A) of the DL OFDMA PPDU in the example of FIG. 17. Therefore, after receiving the HE-SIG-A field, STA21 may move to its allocated subchannel and start to receive a HE-STF, a HE-LTF, a HE-SIG-B, and a PSDU. However, STA21 may be aware from the RA field of the MAC header of the PSDU that the actual destination STA of the PSDU is STA11. In this case, STA21 may perform the afore-described NAV update operation. That is, since the value of the RA field of a frame received on any subchannel of a 40-MHz OFDMA PPDU on a primary 40-MHz channel does not match to the MAC address of STA21, STA21 may set a NAV value based on the value of the Duration field of the MAC header of the PSDU.

As described above, if a third-party STA receiving a HE PPDU supporting DL/UL OFDMA determines that the third-party STA is not an actual destination STA of a frame received even on a part (e.g., a subchannel) of a transmission channel bandwidth of the HE PPDU (e.g., the RA value of the received frame does not match to the address of the third-party STA), the third-party STA may perform NAV update based on the Duration field of the MAC header of the frame.

Even though the HE PPDU supporting DL/UL OFDMA received at the third-party STA has been transmitted on a secondary 20-MHz, 40-MHz, or 80-MHz channel, not on a primary 20-MHz, 40-MHz, or 80-MHz channel, if the third-party STA determines that the third-party STA is not an actual destination of the received frame (e.g., the RA value of the received frame does not match to the address of the third-party STA), the third-party STA may perform NAV update based on the Duration field of the MAC header of the frame.

In the example of FIG. 17, if resource allocation information for the other third-party STA(s) except for STA21 is not included in the received PPDU, the other third-party STA(s) may determine that the other third-party STA(s) is not a destination STA of the HE PPDU. In this case, the other STA(s) may not perform transmission during a time period determined based on duration information included in a PHY header (e.g., L-SIG, HE-SIG-A, HE-SIG-B) and may not process a data unit (e.g. a PSDU) following the PHY header. Meanwhile, although resource allocation information for STA21 is included in the received PPDU and thus STA21 determines that it is a destination STA of the HE PPDU, STA21 may finally determine that it is not a destination STA by checking the RA field of the MAC header of the received frame and thus may perform NAV update using the Duration field of the MAC header in the example of FIG. 17.

Figure 18:
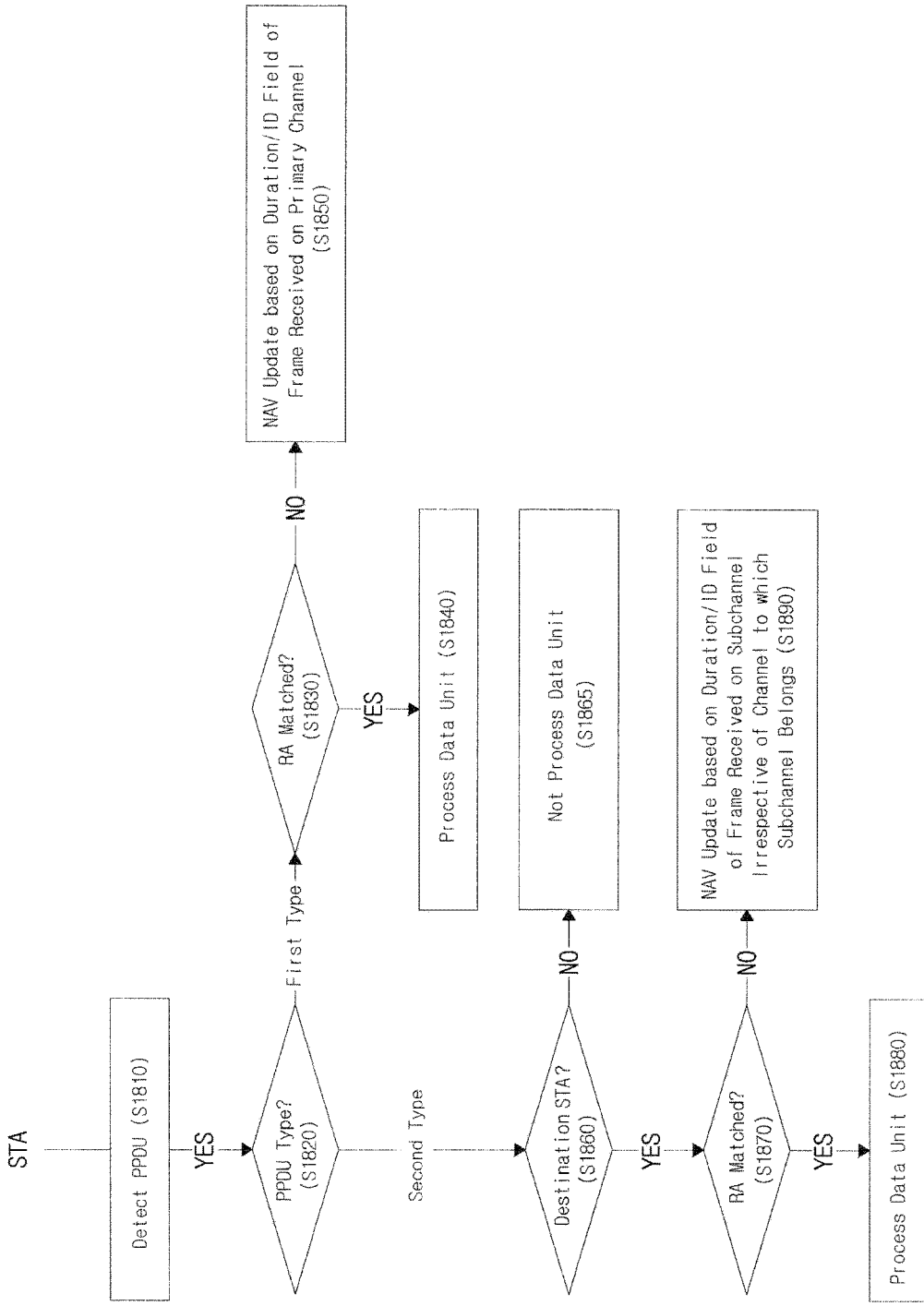
FIG. 18 depicts a NAV update operation of an STA according to the present disclosure.

FIG. 18 depicts a NAV update operation of an STA according to the present disclosure.

Upon detection of reception of a HE PPDU in step S1810, an STA may determine whether the detected HE PPDU is of the first type (e.g., the non-OFDMA PPDU type) or of the second type (e.g., the OFDMA PPDU type) in step S1820.

If the type of the PPDU is the first type, particularly the non-OFDMA PPDU type, the STA may determine whether the value of the RA field of the MAC header of a data unit in the non-OFDMA PPDU matches to an address of the STA in step S1830.

If the STA determines that the value of the RA field of the MAC header of the data unit matches to the address of the STA, the STA may process (e.g., decode) the data unit in step S1840.

On the contrary, if the STA determines that the value of the RA field of the MAC header of the data unit does not match to the address of the STA, the STA may perform NAV update according to a NAV update operation for an STA receiving a non-OFDMA PPDU in step S1850. Specifically, the STA performs NAV update based on the Duration/ID field of a frame received on a primary channel. If the STA receives a frame that belongs to a secondary channel, not the primary channel, the STA does not perform NAV update. The examples described in relation to step S1630 of FIG. 16 are also applicable to step S1850 of FIG. 18.

If the type of the PPDU is the second type, particularly the OFDMA PPDU type, the STA may determine whether it is a destination STA of the PPDU in step S1860. The STA may determine whether it is a destination STA of the PPDU based on information included in the PHY header (e.g., HE-SIG-A or HE-SIG-B) of the detected PPDU. For example, upon detection of the HE PPDU, if resource allocation information included in the HE-SIG-A or HE-SIG-B field of the HE PPDU indicates the presence of a resource unit allocated to the STA, the STA may determine that it is a destination STA of the HE PPDU, and otherwise, the STA may determine that it is not a destination STA of the HE PPDU.

If the STA determines that it is not a destination STA of the HE PPDU in step S1860, the STA may not process a data unit (e.g., a PSDU) following the PHY header in step S1865. In addition, the STA may not perform transmission during a time period determined based on duration information included in the PHY header (e.g., L-SIG, HE-SIG-A, or HE-SIG-B).

If the STA determines that it is a destination STA of the HE PPDU in step S1860, the STA may determine whether the value of the RA field of the MAC header of a data unit in the OFDMA PPDU (i.e., a data unit received in a resource unit indicated by the resource allocation information of the HE preamble of the OFDMA PPDU) matches to the address of the STA in step S1870.

If the value of the RA field of the MAC header of the data unit received in the resource unit allocated to the STA matches to the address of the STA, the STA may process (e.g., decode) the data unit received in the resource unit allocated to the STA in step S1880.

On the contrary, if the value of the RA field of the MAC header of the data unit received in the resource unit allocated to the STA does not match to the address of the STA, the STA may perform NAV update according to a NAV update operation for an STA receiving an OFDMA PPDU in step S1890. That is, if the type of the PPDU is the second type, the STA may perform NAV update based on the Duration/ID field of a frame received on a subchannel irrespective of a channel to which the received subchannel belongs (i.e., without considering whether the subchannel carrying the PPDU belongs to a primary channel or a secondary channel). The examples described in relation to step S1640 of FIG. 16 is also applicable to step S1890 of FIG. 18.

Now, a description will be given of a method for performing UL SU PPDU transmission or UL MU PPDU transmission according to the type of a response to DL MU transmission. For example, while UL SU transmission of a response to DL MU transmission is basically supported, if responses to DL MU transmission can be transmitted in UL MU transmission, system performance such as DL throughput may be significantly increased.

UL MU-MIMO transmission is taken as an example of UL MU transmission in the following examples of the present disclosure. However, the examples of the present disclosure are also applicable in the same manner to UL OFDMA transmission in which one transmission channel is divided into a plurality of subchannels and each STA performs simultaneous UL transmission on an allocated subchannel. Similarly, DL MU-MIMO transmission is taken as an example of DL MU transmission in the following examples of the present disclosure. However, the examples of the present disclosure are also applicable in the same manner to DL OFDMA transmission in which one transmission channel is divided into a plurality of subchannels and simultaneous DL transmission is performed on respective subchannels allocated to STAs. That is, UL MU transmission includes UL MU-MIMO transmission or UL OFDMA transmission, and DL MU transmission includes DL MU-MIMO transmission or DL OFDMA transmission, in the following description.

Figure 19:
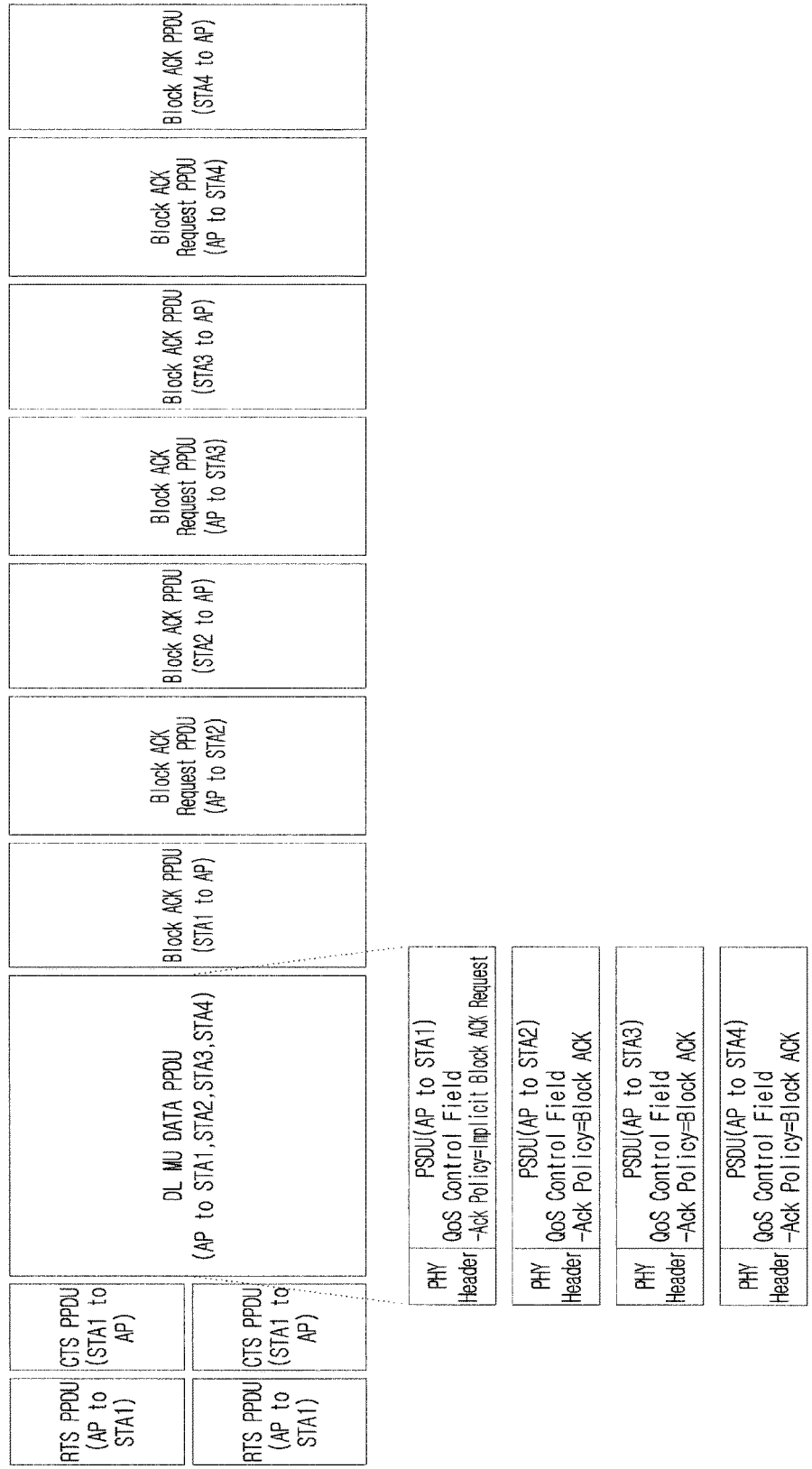
FIG. 19 depicts an exemplary operation for transmitting an Acknowledgement (ACK) in response to DL Multi-User (MU) transmission in an Uplink (UL) Single User (SU) transmission scheme.

FIG. 19 depicts an exemplary UL SU transmission-based ACK procedure in response to DL MU transmission.

In a DL MU transmission operation, an AP may transmit a DL MU PPDU to destination STAs of the DL MU transmission after exchanging an RTS frame and a CTS frame with one of the STAs of the DL MU transmission. The QoS Control fields of the MAC headers of a plurality of data units (e.g., PSDUs) in the DL MU PPDU may include ACK Policy subfields. While the ACK Policies of the destination STAs of the DL MU PPDU may be set to Block ACK, the ACK Policy of one of the destination STAs may be set to Implicit Block ACK Request. Thus, the STA for which the ACK Policy is set to Implicit Block ACK Request may transmit a block ACK frame to the AP a predetermined IFS (e.g., an SIFS) after receiving the DL MU PPDU, without receiving a block ACK request frame. On the other hand, an STA(s) for which the ACK Policy is set to Block ACK may transmit a block ACK frame to the AP a predetermined IFS (e.g., an SIFS) after receiving a block ACK request frame from the AP.

The DL MU PPDU may include information requesting one STA to transmit an immediate response to the DL MU PPDU (e.g., a UL response transmitted a predetermined IFS (e.g., an SIFS) after receiving the DL MU PPDU), that is, information triggering UL SU transmission (or a UL SU transmission trigger frame).

If the ACK Policy is set to Implicit Block ACK Request for two or more of the destination STAs of the DL MU transmission, the plurality of STAs may transmit block ACK frames simultaneously (i.e., a predetermined IFS (e.g., an SIFS) after reception of the DL MU PPDU), thereby causing collision between them. Therefore, the ACK Policy for the DL MU PPDU should be set to Implicit Block ACK Request only for one STA, and otherwise, Implicit Block ACK Request may not be used.

In the example of FIG. 19, before transmitting a DL MU PPDU to a plurality of STAs (e.g., STA1, STA2, STA3, and STA4) on a 40-MHz channel, the AP may transmit an RTS frame to one (e.g., STA1) of the plurality of STAs in duplicated PPDUs on a primary 20-MHz channel (i.e., a lower-frequency 20-MHz channel) and a secondary 20-MHz channel (i.e., a higher-frequency 20-MHz channel). STA1 may transmit a CTS frame to the AP in duplicated PPDUs on the primary 20-MHz channel and the secondary 20-MHz channel in response to the received RTS frame.

The DL MU DATA PPDU transmitted by the AP may include PSDUs directed to STA1, STA2, STA3, and STA4. The ACK Policy of a PSDU may be set to Implicit Block ACK Request for STA1, and to Block ACK for STA2, STA3, and STA4. Therefore, STA1 may determine from the PSDU of the DL MU DATA PPDU that the ACK Policy is Implicit Block ACK Request and transmit a block ACK PPDU to the AP a predetermined IFS (e.g., an SIFS) after receiving the DL MU DATA PPDU. To receive block ACK PPDUs from STA2, STA3, and STA4, the AP may transmit block ACK request PPDUs sequentially STA2, STA3, and STA4.

Figure 20:
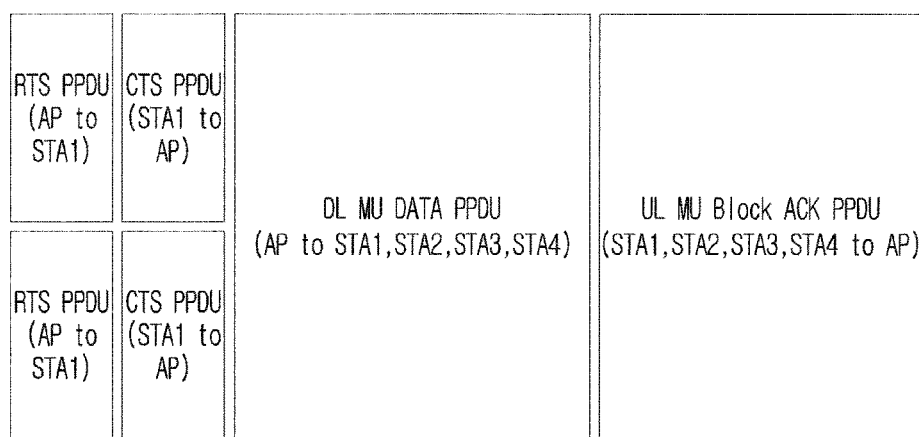
FIG. 20 depicts an exemplary operation for transmitting an ACK in response to UL MU transmission in a UL MU transmission scheme.

FIG. 20 depicts an exemplary UL MU transmission-based ACK procedure in response to DL MU transmission.

To improve the performance of a procedure for performing DL MU transmission and transmitting an ACK in response to the DL MU transmission, block ACKs may be transmitted in UL MU transmission. For example, if all of the destination STAs of a DL MU DATA PPDU support UL MU transmission, a procedure for receiving block ACK PPDUs from the STAs may be simplified and thus the use efficiency of a wireless channel may be increased.

As illustrated in the example of FIG. 20, after the AP and STA1 exchange an RTS frame and a CTS frame on a 40-MHz channel, the AP may transmit a DL MU DATA PPDU to STA1, STA2, STA3, and STA4 on the 40-MHz channel. If all of STA1, STA2, STA3, and STA4 support UL MU transmission, STA1, STA2, STA3, and STA4 may simultaneously transmit a UL MU block ACK PPDU to the AP a predetermined IFS (e.g., an SIFS) after receiving the DL MU DATA PPDU.

For example, STA1, STA2, STA3, and STA4 may be allocated distinguishable streams and simultaneously transmit block ACK frames in a UL PPDU having a transmission channel bandwidth of 40 MHz to the AP in UL MU-MIMO transmission. Or STA1, STA2, STA3, and STA4 may all be allocated subchannels each having a bandwidth less than 40 MHz in a 40-MHz UL PPDU and transmit block ACK frames simultaneously to the AP in UL OFDMA.

To enable STA2, STA3, and STA4 to simultaneously transmit a UL MU block ACK PPDU, the ACK Policy may be set to Implicit Block ACK Request for STA1, STA2, STA3, and STA4 in the DL MU DATA PPDU.

As described above, information eliciting a plurality of STAs to transmit immediate responses (e.g., UL responses transmitted a predetermined IFS (e.g., an SIFS) after reception of a DL MU PPDU) to the DL MU PPDU, that is, information triggering UL MU transmission (or a UL MU transmission trigger frame) may be included in the DL MU PPDU.

As described with reference to the examples of FIGS. 19 and 20, an immediate response to a DL MU PPDU may be of a UL SU transmission type or a UL MU transmission type. The type of the immediate response may be indicated by information included in the DL MU PPDU (e.g., a block ACK request). That is, information indicating the type of the immediate response to the DL MU PPDU (e.g., a response frame transmitted in UL SU transmission or a response frame transmitted in UL MU transmission) may be included in the DL MU PPDU (e.g., a block ACK request included in the DL MU PPDU). Also, the DL MU PPDU may include a block ACK request PPDU for the plurality of STAs.

Figure 21:
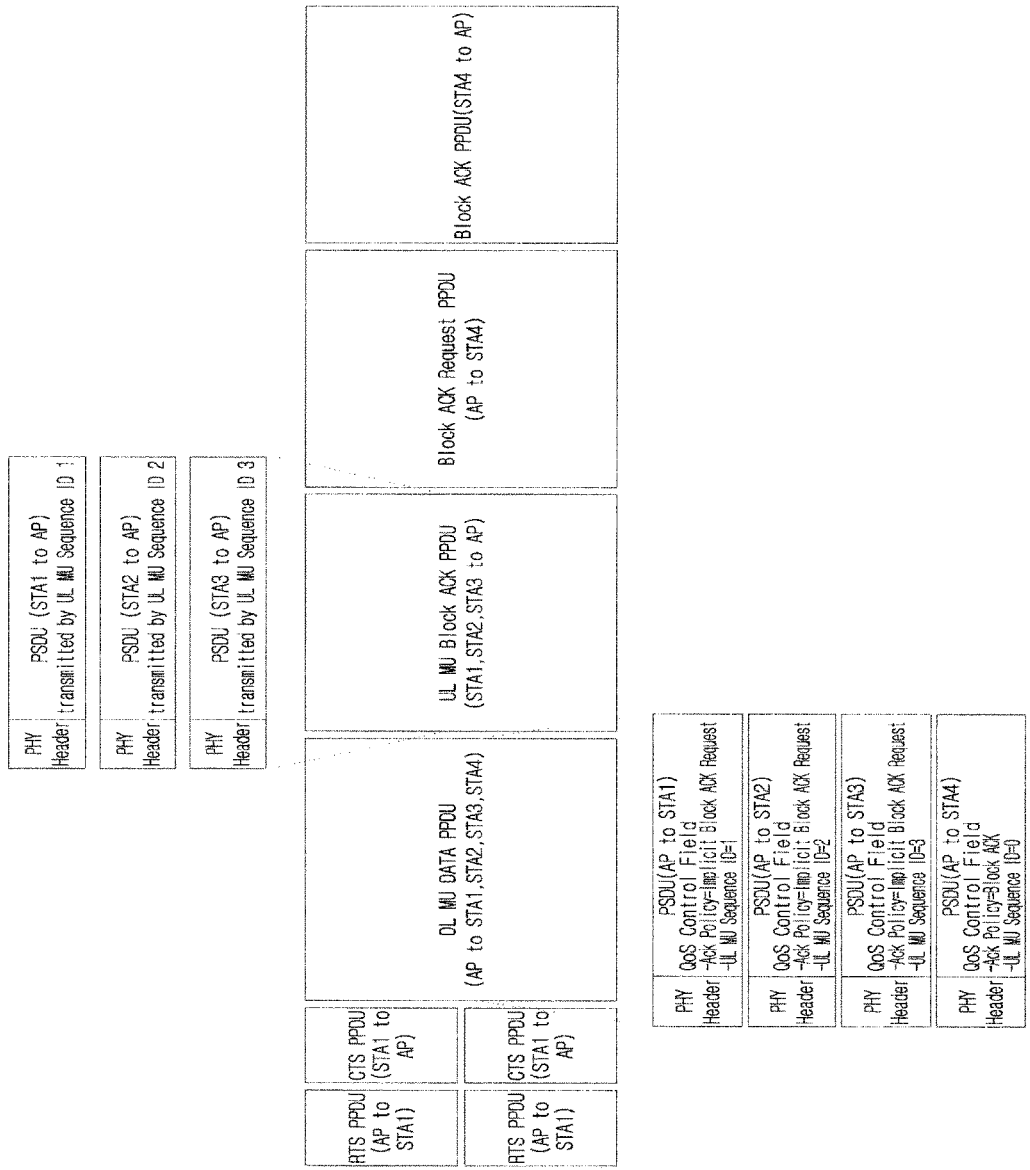
FIGS. 21 and 22 depict various types of UL responses to DL MU transmission.
Figure 22:
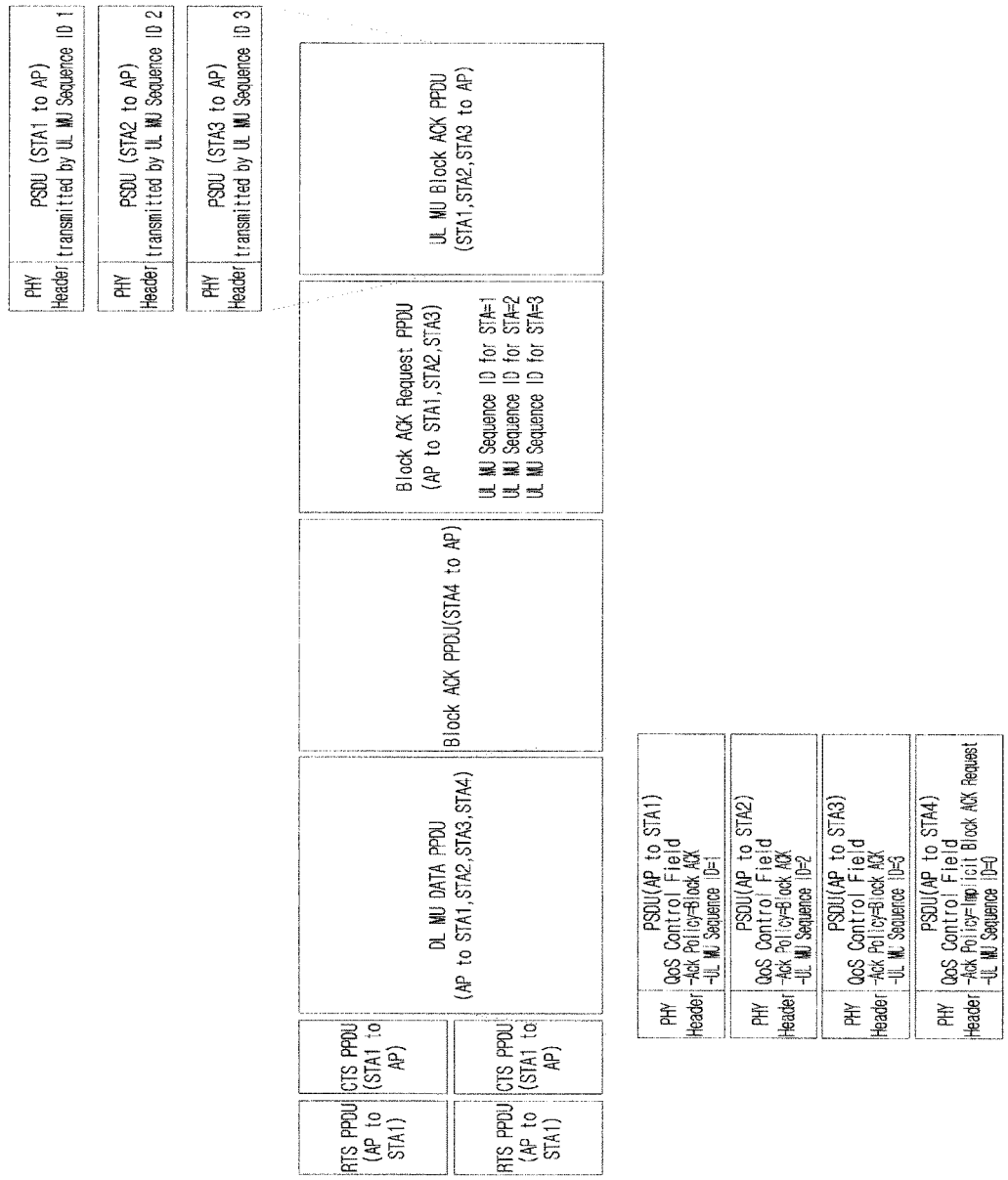

FIGS. 21 and 22 depict various types of UL responses to DL MU transmission.

All destination STAs of a DL MU DATA PPDU may not be assumed to support UL MU transmission. Therefore, the destination STAs of the DL MU DATA PPDU may be classified into UL MU transmission supported STAs and UL MU transmission non-supported STAs, and a UL transmission scheme may be determined for the DL MU DATA PPDU accordingly.

The AP may request a UL MU transmission supported STA to transmit a UL MU block ACK PPDU (i.e., the AP may provide a response request (or trigger) indicating the UL MU transmission-based response type). Meanwhile, the AP may request a UL MU transmission non-supported STA to transmit a UL SU block ACK PPDU (e.g., a legacy block ACK PPDU) (i.e., the AP may provide a response request (or trigger) indicating the UL SU transmission-based response type).

Such different types of UL responses may not be transmitted simultaneously. Therefore, a UL response request (or trigger) may be provided such that different types of UL responses to a DL MU DATA PPDU may be transmitted at different time points. For example, to receive block ACK PPDUs from a plurality of STAs including UL MU transmission supported STAs and a UL MU transmission non-supported STA(s), the AP may include an implicit block ACK request in the DL MU PPDU or an explicit block ACK request in a separate block ACK request PPDU, and transmit the DL MU PPDU sequentially to the UL MU transmission supported STAs and the UL MU transmission non-supported STA(s).

In the examples of FIGS. 21 and 22, it is assumed that STA1, STA2, and STA3 are UL MU transmission supported STAs and STA4 is a UL MU transmission non-supported STA. If the destination STAs of a DL MU DATA PPDU include both a UL MU transmission supported STA and a UL MU transmission non-supported STA, the ACK Policy may be set to Implicit Block ACK Request for one or more STAs supporting one (a first type) of different UL immediate response types and to Block ACK for one or more STAs supporting the other type (a second type). Herein, the first type may be the UL MU transmission-based response type and the second type may be the UL SU transmission-based response type. Or the first type may be the UL SU transmission-based response type and the second type may be the UL MU transmission-based response type.

In the example of FIG. 21, the ACK Policy is set to Implicit Block ACK Request for STA1, STA2, and STA3 supporting UL MU transmission (i.e., supporting the UL MU transmission-based response type) in a DL MU DATA PPDU. In this case, STA1, STA2, and STA3 may transmit a UL MU Block ACK PPDU to the AP a predetermined IFS (e.g., an SIFS) after receiving the DL MU DATA PPDU. That is, the UL MU transmission supported STAs (i.e., STAs supporting the UL MU transmission-based response type), STA1, STA2, and STA3 may simultaneously transmit block ACK frames in UL MU transmission. Since different channel estimation sequences (e.g., HE-STF and HE-LTF sequences) are used for the plurality of STAs participating in the UL MU transmission, the AP may receive the block ACK frames from the plurality of STAs without collision.

Since a UL MU transmission non-supported STA (i.e., an STA supporting only the UL SU transmission-based response type) is not allowed to transmit a block ACK fame simultaneously with other STAs, the ACK Policy may not be set to Implicit Block ACK Request for the UL MU transmission non-supported STA except for the case where the ACK Policy is set to Implicit Block ACK Request for only one STA in a DL MU DATA PPDU.

In the example of FIG. 21, since the ACK Policy is set to Implicit Block ACK Request for STA1, STA2, and STA3, the ACK Policy may be set to not Implicit Block ACK Request but Block ACK for STA4 that does not support UL MU transmission (i.e., supporting only the UL SU transmission-based response type). In this case, STA4 may transmit a legacy block ACK PPDU (or a UL SU block ACK PPDU) a predetermined IFS (e.g., an SIFS) after receiving a block ACK request PPDU from the AP.

Meanwhile, in the example of FIG. 22, the ACK Policy is set to Block ACK for STA1, STA2, and STA3 supporting UL MU transmission (i.e., supporting the UL MU transmission-based response type) and to Implicit Block ACK Request for STA4 that does not support UL MU transmission (i.e., supporting only the UL SU transmission-based response type) in a DL MU DATA PPDU. In this case, STA4 may transmit a block ACK PPDU (e.g., a legacy block ACK PPDU or a UL SU block ACK PPDU) a predetermined IFS (e.g., an SIFS) after receiving the DL MU DATA PPDU from the AP. STA1, STA2, and STA3 may transmit a UL MU block ACK PPDU to the AP a predetermined IFS (e.g., an SIFS) after receiving a block ACK request PPDU from the AP. That is, the UL MU transmission supported STAs (i.e., STAs supporting the UL MU transmission-based response type), STA1, STA2, and STA3 may simultaneously transmit block ACK frames in UL MU transmission. Since different channel estimation sequences (e.g., different scrambling codes used in generation of HE-STFs and HE-LTFs) are used for the plurality of STAs participating in the UL MU transmission, the AP may receive the block ACK frames from the plurality of STAs without collision.

As described above with reference to the examples of FIGS. 21 and 22, the PPDU type of an immediate response to a DL MU PPDU (i.e., a UL response transmitted a predetermined IFS (e.g., an SIFS) after reception of a DL MU PPDU) may be of the UL SU transmission type (e.g. a legacy PPDU type) or the UL MU transmission type (e.g., a UL MU PPDU type), and the type of the immediate response to the DL MU PPDU may be determined based on information (e.g., information triggering UL transmission) included in the DL MU PPDU.

If the immediate response to the DL MU PPDU is of the UL MU transmission type, identification information about different channel estimation sequences (e.g., HE-STF and HE-LTF sequences) to be used in UL MU PPDU transmission by a plurality of STAs may be included in the DL MU PPDU. The identification information about the channel estimation sequences may be defined as information indicating one element of a set including a plurality of elements corresponding to a plurality of channel estimation sequences (or scrambling codes for generation of the channel estimation sequences). That is, the identification information about the channel estimation sequences corresponds to information that allocates resources (e.g., sequence resources or code resources) distinguishable for a plurality of STAs in UL MU transmission of the STAs.

Further, the identification information about the channel estimation sequences for the UL MU transmission may be included in a frame (e.g., a DL MU PPDU) eliciting the UL MU transmission. For example, the identification information about the channel estimation sequences for the UL MU transmission may be included in a UL MU transmission trigger frame (i.e., a frame including information triggering a UL MU transmission-based response) in the DL MU PPDU. Or the identification information about the channel estimation sequences for the UL MU transmission may be included in each of a plurality of PSDUs of the DL MU PPDU. More specifically, a UL MU Sequence ID subfield of the QoS Control field of the MAC header in the DL MU DATA PPDU may indicate a channel estimation sequence for the UL MU transmission. Or the identification information (e.g., the UL MU Sequence ID subfield) about the channel estimation sequences for the UL MU transmission may be included in a VHT Control field, a HE Control field, a Service field, etc.

If the identification information (e.g., the UL MU Sequence ID subfield) about the channel estimation sequences for the UL MU transmission has a specific value (e.g., 0), it may indicate that a UL immediate response PPDU transmitted a predetermined IFS (e.g., an SIFS) after reception of the DL MU PPDU is of the UL SU PPDU type (or the legacy PPDU type). On the other hand, if the identification information (e.g., the UL MU Sequence ID subfield) about the channel estimation sequences for the UL MU transmission has a value other than the specific value (e.g., 0), it may indicate that the UL immediate response PPDU transmitted a predetermined IFS (e.g., an SIFS) after reception of the DL MU PPDU is of the UL MU PPDU type. In this case, one channel estimation sequence (or one scrambling code for generation of the channel estimation sequence) may be determined from a set of a plurality of channel estimation sequences (or scrambling codes for generation of the channel estimation sequences) based on the identification information (e.g., the UL MU Sequence ID subfield) about the channel estimation sequences for the UL MU transmission.

Referring to FIG. 21 again, the ACK Policy is set to Implicit Block ACK Request commonly for the UL MU transmission supported STAs (i.e., STAs supporting the UL MU transmission-based response type), STA1, STA2, and STA3, and the values of UL MU Sequence ID subfields are 1, 2, and 3, respectively for STA1, ST2, and STA3. When STA1, STA2, and STA3 transmit the UL MU block ACK PPDU to the AP a predetermined IFS (e.g., an SIFS) after receiving the DL MU DATA PPDU, STA1, STA2, and STA3 may perform the UL MU transmission using different channel estimation sequences corresponding to the values of the UL MU Sequence ID subfields, 1, 2, and 3. On the other hand, the value of the UL MU Sequence ID subfield is set to 0 for the UL MU transmission non-supported STA (i.e., the STA supporting only the UL SU transmission-based response type), STA4, and STA4 may transmit a legacy block ACK PPDU (or a UL SU block ACK PPDU) to the AP a predetermined IFS (e.g., an SIFS) after receiving a block ACK request PPDU from the AP.

Referring to FIG. 22 again, the ACK Policy is set to Implicit Block ACK Request for the UL MU transmission non-supported STA (i.e., the STA supporting only the UL SU transmission-based response type), STA4, and the value of the UL MU Sequence ID subfield is set to 0 for STA4. STA4 may transmit a legacy block ACK PPDU (or a UL SU block ACK PPDU) to the AP a predetermined IFS (e.g., an SIFS) after receiving the DL MU DATA PPDU from the AP. On the other hand, the ACK Policy is set to Implicit Block ACK Request commonly for the UL MU transmission supported STAs (i.e., STAs supporting the UL MU transmission-based response type), STA1, ST2, and STA3, and the values of UL MU Sequence ID subfields are 1, 2, and 3, respectively for STA1, ST2, and STA3. When STA1, STA2, and STA3 transmit a UL MU block ACK PPDU to the AP a predetermined IFS (e.g., an SIFS) after receiving a block ACK request PPDU, STA1, STA2, and STA3 may perform the UL MU transmission using different channel estimation sequences corresponding to the values of the UL MU Sequence ID subfields, 1, 2, and 3.

Like the afore-described DL MU PPDU, the block ACK request PPDU that the AP transmits to the plurality of STAs (e.g., STA1, STA2, and STA3) may include information indicating the type of a UL transmission PPDU (e.g., a UL MU transmission-based PPDU type) as an immediate response to the block ACK request PPDU, and channel estimation sequence identification information (e.g., a UL MU Sequence ID subfield) for UL MU transmission for each STA participating in the UL MU transmission.

Additionally, if the UL MU transmission supported STAs (i.e., the STAs supporting the UL MU transmission-based response type) simultaneously transmit block ACK frames in a UL MU PPDU to the AP, the transmission times of the block ACK frames transmitted by the plurality of STAs may be identical. If the transmission times of the block ACK frames transmitted simultaneously by the plurality of STAs are different, the load of processing the block ACK frames at the AP increases. To prevent the increase of the load, the transmission times of the block ACK frames transmitted by the plurality of STAs may be made identical (e.g., the block ACK frames may be made start at the same time and end at the same time). The same transmission time of the block ACK frames transmitted by the plurality of STAs may mean the same transmission MCS of the block ACK frames transmitted by the plurality of STAs.

In the example of FIG. 21, to make the transmission times of the UL MU block ACK PPDU transmitted by STA1, STA2, and STA3 supporting UL MU transmission (i.e., the UL MU transmission-based response type) identical, MCS information may be included in the DL MU DATA PPDU. That is, the plurality of STAs participating in UL MU transmission may use an MCS value indicated by the MCS information for the UL MU transmission, included in the DL MU DATA PPDU, for transmission of the UL MU PPDU including the block ACK frames. Specifically, a UL MU MCS subfield of the QoS Control field of the MAC header in the DL MU DATA PPDU may indicate an MCS value for the UL MU transmission. Or the MCS information for the UL MU transmission (e.g., the UL MU MCS subfield) may be included in a VHT Control field, a HE Control field, a Service field, etc.

In the example of FIG. 22, to make the transmission times of the UL MU block ACK PPDUs transmitted by STA1, STA2, and STA3 supporting UL MU transmission (i.e., the UL MU transmission-based response type) identical, MCS information for the UL MU transmission may be included in the block ACK request PPDU.

As described before, a frame eliciting UL MU transmission may include information based on which at least one of the type of a UL MU PPDU, resources for use in the UL MU transmission, and an MCS of the UL MU transmission. That is, a frame (e.g., a DL MU DATA PPDU or a block ACK request PPDU for a plurality of STAs) eliciting UL MU transmission (e.g., a UL immediate response) may include at least one of information based on which a UL MU PPDU type (i.e., the UL MU transmission-based PPDU type or the UL SU transmission-based PPDU type) is determined, information based on which distinguishable resources for use in the UL MU transmission (e.g., sequence resources or code resources) are determined, information based on which a UL MU transmission time is determined, and information based on which an MCS applied to the UL MU transmission is determined.

If UL MU transmission supported STAs (i.e., STAs supporting the UL MU transmission-based response type) simultaneously transmit block ACK frames in a UL MU PPDU, the Duration fields of the block ACK frames may have the same value. The value of the Duration fields included in the UL MU PPDU may be set to a value calculated by subtracting a transmission time of the UL MU transmission and a predetermined IFS (e.g., an SIFS) from the value of the Duration field included in the frame eliciting the transmission of the UL MU PPDU (e.g., the DL MU DATA PPDU, or the block ACK request PPDU for a plurality of STAs). In this case, if a third-party STA receiving the UL MU PPDU determines that it is not a destination STA of the received frame even in a part of the transmission channel bandwidth of the UL MU PPDU (e.g., a subchannel) (e.g., if the RA value of the received frame does not match to the address of the third-party STA), the third-party STA may perform NAV update based on the value of the Duration field set in the above manner.

Figure 23:
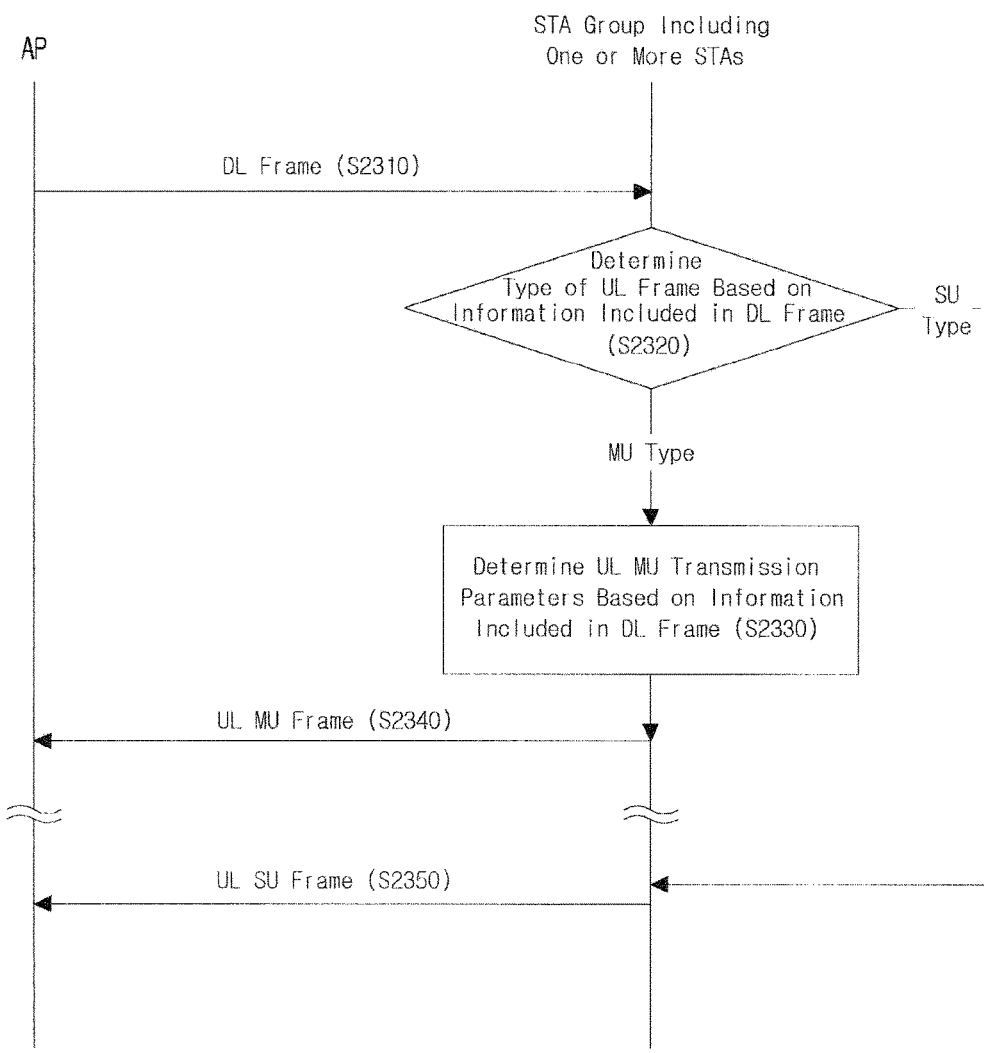
FIG. 23 depicts an exemplary method according to the present disclosure.

FIG. 23 depicts an exemplary method according to the present disclosure.

In step S2310, an AP may transmit a DL frame to an STA group including one or more STAs. The DL frame may correspond to a DL MU DATA PPDU or a block ACK request PPDU described in the foregoing examples. The DL frame may include information about the type of a UL frame transmitted as an immediate response (i.e., transmitted a predetermined IFS (e.g., an SIFS) after reception of the DL frame). The UL frame may correspond to a block ACK PPDU described in the foregoing examples. The type of the UL frame may be an SU type or an MU type. If the information about the type of a UL frame, included in the DL frame is the MU type, the DL frame may further include resource allocation information, transmission time information, and MCS information for a plurality of STAs, for transmission of UL frames (i.e., a UL MU frame).

In step S2320, each STA of the STA group may determine the type of the UL frame elicited by the DL frame based on the information (e.g., the information about the type of a UL frame) included in the received DL frame. If the type of the UL frame is the MU type, the STA may determine UL MU transmission parameters (e.g., a resource index for the STA, for transmission of the UL MU frame, a transmission time of the UL MU frame, and an MCS to be applied to the UL MU frame) based on the information included in the DL frame (e.g., the resource allocation information, the transmission time information, and the MCS information). Therefore, a plurality of STAs may simultaneously transmit a UL MU frame to the AP in step S2340.

If the type of the UL frame is determined to be the SU type in step S2320, one STA may transmit a UL SU frame to the AP in step S2350.

While the afore-described exemplary methods of present disclosure have been described as a series of operations for simplicity of description, this does not limit the sequence of steps. When needed, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the afore-described exemplary methods of present disclosure.

The present disclosure includes an apparatus for processing or performing the method of the present disclosure (e.g., the wireless device and its components described with reference to FIGS. 1, 2, and 3).

The present disclosure includes software (an operating system (OS), an application, firmware, a program, etc.) for executing the method of the present disclosure in a device or a computer, and a medium storing the software that can be executed in a device or a computer.

While various embodiments of the present disclosure have been described in the context of an IEEE 802.11 system, they are applicable to various mobile communication systems.

What is claimed is:

1. A method for transmitting an uplink frame by a station (STA) to an access point (AP) in a wireless local area network, the method comprising:
   receiving, from the AP, a downlink frame including acknowledgment information representing whether the STA is requested to transmit the uplink frame as a single-user (SU) type or as a multiple-user (MU) type; and
   transmitting, to the AP, the uplink frame based on the acknowledgment information,
   wherein transmitting the uplink frame comprises:
      when the acknowledgment information represents that the STA is requested to transmit the uplink frame as the MU type, transmitting the uplink frame simultaneously with transmission of at least one uplink frame from at least one other STA, and
      when the acknowledgment information represents that the STA is requested to transmit the uplink frame as the SU type, transmitting the uplink frame in an SU format,
   wherein when the downlink frame is a first type, a network allocation vector (NAV) update is performed based on a duration field of a frame received on a primary channel, and
   wherein when the downlink frame is a second type, the NAV update is performed based on a duration field of a frame received on a subchannel, irrespective of whether the subchannel belongs to the primary channel or a secondary channel.

2. The method according to claim 1,
wherein the downlink frame further includes resource allocation information for a plurality of STAs, and
wherein the resource allocation information includes information indicating distinguished resources for each of the plurality of STAs.

3. The method according to claim 1,
wherein the downlink frame further includes Modulation and Coding Scheme (MCS) information for the uplink frame.

4. The method according to claim 3,
wherein a same MCS based on the MCS information is applied to the uplink frame by a plurality of STAs.

5. The method according to claim 1,
wherein, when the acknowledgment information represents that the STA is requested to transmit the uplink frame as the SU type, the uplink frame is transmitted only by the STA.

6. The method according to claim 1,
wherein the uplink frame is transmitted as an immediate response to the downlink frame.

7. The method according to claim 6,
wherein the immediate response is transmitted a Short Inter-Frame Space (SIFS) time after the downlink frame.

8. The method according to claim 1,
wherein the downlink frame includes downlink data for a plurality of STAs.

9. The method according to claim 1,
wherein the downlink frame includes block acknowledgement (ACK) requests for a plurality of STAs.

10. A method for receiving an uplink frame by an access point (AP) from at least one station (STA) in a wireless local area network, the method comprising:
    transmitting, to the at least one STA, a downlink frame including acknowledgment information representing whether the at least one STA is requested to transmit the uplink frame as a single-user (SU) type or as a multiple-user (MU) type; and
    receiving, from the at least one STA, the uplink frame based on the acknowledgment information,
    wherein receiving the uplink frame comprises:
       when the acknowledgment information represents that the at least one STA is requested to transmit the uplink frame as the MU type, receiving the uplink frame simultaneously with reception of at least one uplink frame from at least one other STA, and
       when the acknowledgment information represents that the at least one STA is requested to transmit the uplink frame as the SU type, receiving the uplink frame in an SU format,
    wherein when the downlink frame is a first type, causing a network allocation vector (NAV) update to be performed based on a duration field of a frame received on a primary channel, and
    wherein when the downlink frame is a second type, causing the NAV update to be performed based on a duration field of a frame received on a subchannel, irrespective of whether the subchannel belongs to the primary channel or a secondary channel.

11. The method according to claim 10,
wherein the downlink frame further includes resource allocation information for a plurality of STAs.

12. The method according to claim 11,
wherein the resource allocation information includes information indicating distinguished resources for each of the plurality of STAs.

13. The method according to claim 10,
wherein the downlink frame further includes Modulation and Coding Scheme (MCS) information for the uplink frame, and
wherein a same MCS based on the MCS information is applied to the uplink frame by a plurality of STAs.

14. The method according to claim 10,
wherein, when the acknowledgment information represents that the at least one STA is requested to transmit the uplink frame as the SU type, the uplink frame is transmitted only by a STA.

15. The method according to claim 10,
wherein the uplink frame is received as an immediate response to the downlink frame.

16. The method according to claim 15,
wherein the immediate response is received a Short Inter-Frame Space (SIFS) time after the downlink frame.

17. The method according to claim 10,
wherein the downlink frame includes downlink data for a plurality of STAs.

18. The method according to claim 10,
wherein the downlink frame includes block acknowledgement (ACK) requests for a plurality of STAs.

19. The method according to claim 1,
wherein the first type is the SU type, and the second type is the MU type,
wherein when (a) the downlink frame is the SU type and (b) a receiver address of the downlink frame does not match an address of the STA, the STA performs the NAV update based on the duration field of the frame received on the primary channel, and
wherein when (a) the downlink frame is the MU type, (b) the STA is a destination STA of the downlink frame, and (c) the receiver address of the downlink frame does not match the address of the STA, the STA performs the NAV update based on the duration field of the frame received on the subchannel, irrespective of whether the subchannel belongs to the primary channel or the secondary channel.

20. The method according to claim 10,
wherein the first type is the SU type, and the second type is the MU type,
wherein when (a) the downlink frame is the SU type and (b) a receiver address of the downlink frame does not match an address of the at least one STA, the method causes the at least one STA to perform the NAV update based on the duration field of the frame received on the primary channel, and
wherein when (a) the downlink frame is the MU type, (b) the at least one STA is a destination STA of the downlink frame, and (c) the receiver address of the downlink frame does not match the address of the at least one STA, the method causes the at least one STA to perform the NAV update based on the duration field of the frame received on the subchannel, irrespective of whether the subchannel belongs to the primary channel or the secondary channel.

* * * * *